United States Patent
Orlowski et al.

(10) Patent No.: US 11,877,071 B1
(45) Date of Patent: Jan. 16, 2024

(54) FLICKER AND PROXIMITY DETECTION IN IMAGE SENSORS WITH EMBEDDED LOW POWER READOUT CIRCUITRY

(71) Applicant: Apple Inc., Cupertino, CA (US)

(72) Inventors: John L. Orlowski, Cupertino, CA (US); Ritu Raj Singh, Santa Clara, CA (US); Oray O. Cellek, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/951,060

(22) Filed: Sep. 22, 2022

(51) Int. Cl.
*H04N 23/745* (2023.01)
*H04N 25/62* (2023.01)
*H04N 25/77* (2023.01)
*H04N 25/78* (2023.01)
*G03B 13/20* (2021.01)

(52) U.S. Cl.
CPC ........... *H04N 23/745* (2023.01); *H04N 25/62* (2023.01); *H04N 25/77* (2023.01); *H04N 25/78* (2023.01)

(58) Field of Classification Search
CPC ........ H04N 25/62; H04N 25/77; H04N 25/78; H04N 13/144; G03B 7/099; G03B 13/20; G03B 13/22
See application file for complete search history.

(56) References Cited

U.S. PATENT DOCUMENTS

| | | | |
|---|---|---|---|
| 6,597,406 B2 | 7/2003 | Gloudemans et al. | |
| 8,745,240 B2 * | 6/2014 | Horiuchi | H04N 7/0127 348/226.1 |
| 8,760,624 B2 | 6/2014 | Donaher | |
| 9,131,219 B2 | 9/2015 | Doucet et al. | |
| 9,171,379 B2 | 10/2015 | Mack et al. | |
| 9,307,163 B2 * | 4/2016 | Aota | H04N 23/667 |
| 9,589,348 B1 | 3/2017 | Linde et al. | |
| 10,140,705 B2 | 11/2018 | Wu et al. | |
| 10,540,014 B2 | 1/2020 | Gribetz et al. | |
| 2005/0271421 A1 | 12/2005 | Uemura et al. | |
| 2010/0123810 A1 * | 5/2010 | Grenland | H04N 23/6811 348/294 |
| 2012/0037793 A1 * | 2/2012 | Ong | G02B 19/0071 250/216 |
| 2012/0057046 A1 * | 3/2012 | Tanaka | H04N 23/745 348/229 |
| 2020/0137283 A1 * | 4/2020 | Hamaguchi | H04N 23/72 |
| 2020/0370886 A1 * | 11/2020 | Chen | G01C 3/08 |
| 2021/0281783 A1 * | 9/2021 | Nam | H04N 25/772 |

* cited by examiner

*Primary Examiner* — Marly S Camargo
(74) *Attorney, Agent, or Firm* — Brownstein Hyatt Farber Schreck, LLP

(57) ABSTRACT

Disclosed herein are cameras and image sensors, and electronic devices containing them, having pixel arrays operable both for obtaining images and detecting flicker in ambient light. For flicker detection, such as prior to image capture, light-generated current from a set of pixels of the pixel array is received at a transimpedance amplifier (TIA) that is formed in a common semiconductor substrate with the pixel array. An output signal of the TIA is digitized and signal processed to detect the flicker in the ambient light. Also disclosed are image sensors having pixel arrays with an embedded modulated light source. The modulated light source may be used for proximity detection, either by time-of-flight or intensity variation of reflected light.

20 Claims, 19 Drawing Sheets

FLICKER AND PROXIMITY DETECTION IN IMAGE SENSORS WITH EMBEDDED LOW POWER READOUT CIRCUITRY

FIELD

The present disclosure generally relates to electronic devices with cameras or image sensors that include pixel arrays used for image capture. As described herein, a pixel array may be used to detect a presence of 'flicker' in the ambient lighting of the electronic device (e.g., flicker caused by florescent lights).

BACKGROUND

Electronic devices may include cameras or other image sensors, which cameras or image sensors may include pixel arrays. Examples of such electronic devices include cell phones, tablet or laptop computers, personal digital assistants, and the like.

Such cameras or image sensors may obtain images of scenes in which there is ambient lighting that has a 'flicker'—i.e., a periodic variation in intensity. Flicker may be more common in images of indoor scenes. In some image capture processes of such electronic devices (e.g., a row shutter operation of a pixel array), the flicker may produce horizontal or vertical striations in an acquired image.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Disclosed herein are electronic devices, image sensors, and cameras that include a pixel array configured for both image capture and detection of flicker in ambient lighting. Also disclosed are methods of operation of such devices, image sensors, and cameras.

More specifically, described herein is an image sensor that includes a pixel array, and flicker current detection circuitry (FCDC) formed on a common semiconductor substrate with the pixel array. Pixels of the pixel array include respective photodiodes (PDs) electrically connected to readout circuit elements of the pixel. A set of pixels of the pixel array is electrically connected to the FCDC. Flicker is detected by electrically isolating the respective PDs of the set of pixels from their respective readout circuit elements, combining, by the FCDC, respective light-generated currents of the respective PDs of the set of pixels at the FCDC to form a total light-generated current, and analyzing signal patterns related to the total light-generated current to characterize the flicker in the ambient light. The FCDC may include a transimpedance amplifier that receives the total light-generated current as input.

Also described are electronic devices that include a housing with an aperture, and a camera configured to receive light through the aperture. The camera includes a pixel array positioned to receive ambient light through the aperture on a light receiving side thereof. The pixel array includes flicker current detection circuitry formed with pixels of the pixel array on a common semiconductor substrate. A set of pixels of the pixel array is electrically connected with the FCDC. The electronic device is operable to detect a flicker in an ambient light using a combination of light-generated currents from the set of pixels of the pixel array during a first time interval in which the set of pixels is electrically isolated from respective image readout components, and record an image with the camera during a subsequent time interval using compensation for the detected flicker in the ambient light. The FCDC may include a transimpedance amplifier that is operable to receive the combination of light-generated currents.

The present disclosure also describes an electronic device that includes a housing with an aperture and a camera positioned to receive ambient light through the aperture. The camera includes a pixel array and an associated light source integrated into a common system. The camera is operable to receive the ambient light through the aperture and direct the received ambient light onto the pixel array. In some embodiments, the associated light source is operable to emit light through the aperture, whereas in other embodiments, the light source is operable to emit light through an additional aperture of the electronic device. The electronic device is operable to detect a proximity to an exterior object based on reflections of the emitted light received on the pixel array through the aperture. The light source may be a light-emitting diode. The light source may be modulated by a low frequency square wave, and proximity to the exterior object may be detected based on differences between electrical signals generated at the pixel array during the high amplitude periods and the low amplitude periods of the square wave. Alternatively, the light source may be modulated by a high frequency sinusoidal wave, and the proximity to the exterior object is based on a phase shift between the high frequency sinusoid wave and a signal generated by reflections of the emitted light received on the pixel array.

BRIEF DESCRIPTION OF THE DRAWINGS

The disclosure will be readily understood by the following detailed description in conjunction with the accompanying drawings, wherein like reference numerals designate like structural elements.

Figure 1A:
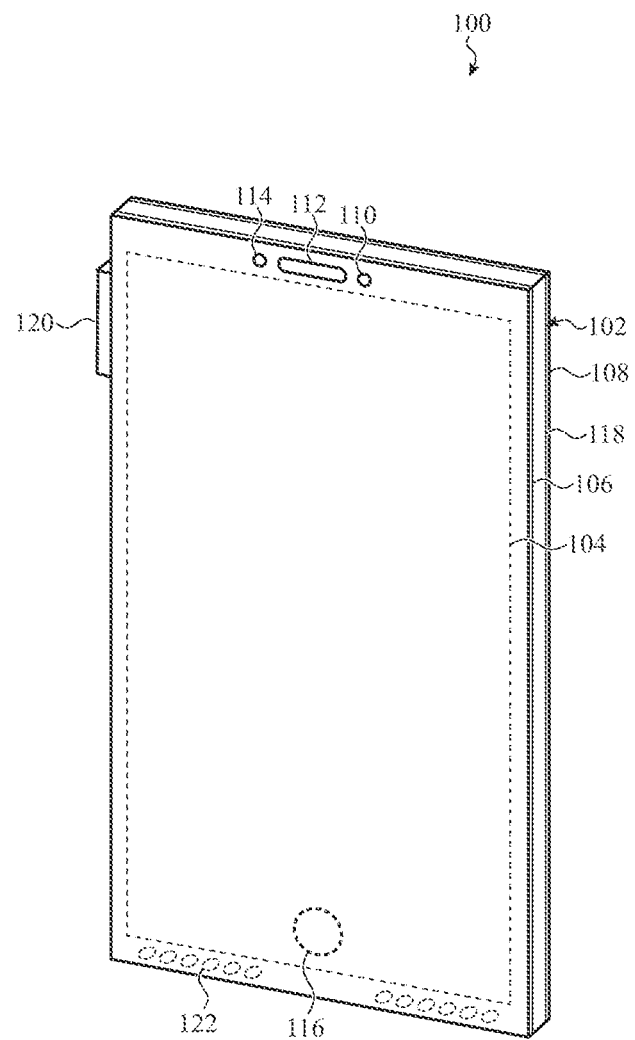
FIGS. 1A and 1B show an example of an electronic device.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The embodiments described herein are directed to image sensors, cameras, and electronic devices that contain such image sensors and cameras. The image sensors or cameras may contain an array of light-gathering pixels, hereafter a 'pixel array.' For simplicity of discussion, hereinafter, 'image sensor' will also refer to cameras or other electronic devices having a pixel array as a component.

During an image or picture capture operation, received light is directed by the image sensor onto the pixel array. A pixel of the pixel array may contain a photodiode (PD) that generates charges (holes and electrons) in response to impinging photons in the received light. Additional electrical components within the pixel, such as reset, gating, and other transistors, may control the flow of the light-generated charges onto pixel output lines during an image read operation, in which the amount of light-generated charge in the photodiode is processed to infer a part of the image to be obtained in the image capture operation. The photodiodes and transistors of the pixels of the pixel array may be fabricated in various semiconductor technologies, such as any of the insulated gate technologies NMOS, PMOS, or CMOS. Various embodiments may use other semiconductor technologies.

Ambient light in the environment of the electronic device may have a time-varying intensity called 'flicker.' Sources of such flicker include fluorescent lighting, which may have a flicker frequency of 120 Hz, twice the power line frequency. Other sources of flicker may also be present in the ambient light. Flicker may cause artifacts in an image obtained by a pixel array of an image sensor. For example, an image sensor may use a 'rolling shutter' image capture operation, in which only a few rows of pixels of a pixel array at a time capture light-generated charges, to allow for concurrent row readout operations of light-generated charges in previously exposed rows of pixels. This may produce horizontal (or vertical) streaking in the total captured image. Other artifacts of flicker in the ambient light may also occur, and may occur in other types of image capture operations. If the flicker signal, such as its frequency components, amplitude, and/or phase, are known before an image capture operation, appropriate compensation steps may be used in the image capture operation.

In some electronic devices, flicker detection may be accomplished through use of an auxiliary sensor. However, this may add extra components, area, and complexity and require additional power consumption.

Instead, certain embodiments disclosed herein implement flicker detection by using the pixel array of the image sensor itself. The pixel arrays in such image sensors have embedded flicker current detection circuitry (FCDC) formed with the pixels of the pixel array on a common semiconductor substrate. A certain subset of the pixels of the pixel array (hereafter 'set of pixels of the pixel array,' or just 'set of pixels') is electrically connected to the FCDC. In some embodiments, the set of pixels of the pixel array may include all pixels of the pixel array.

During a flicker detection operation prior to an image capture operation, the set of pixels of the pixel array may be configured to operate as a photocurrent source whose current is used as an input to the FCDC. More specifically, in some embodiments certain readout circuit elements of the pixels in the set of pixels may be disabled so that little or no light-generated response is output to the image sensor's readout circuit lines. During the flicker detection operation, light-generated charges may flow into in-pixel connections and onto certain circuit lines on the pixel array, which may be dedicated for flicker detection. The light-generated charges of the set of pixels may be combined into a single current, termed herein the 'flicker current.'

The FCDC may include a transimpedance amplifier (TIA) that receives the flicker current and generates an output signal which may drive further circuit elements. The FCDC may be positioned to detect the flicker current either at a junction proximate to the high supply voltage of the pixel array, $V_{DD}$, or at a junction proximate to the ground supply of the pixel array.

In various embodiments, the pixels of the pixel array may be configured for better detection of the flicker current. For example, deep trench isolation (DTI) walls may be formed around each, or some, pixel of the pixel array, though in some embodiments shallow trench isolation may be used. Also, the photodiodes of the pixels may be doped to provide an in-pixel ground connection.

The output signal of the TIA may be received by an analog-to-digital converter (ADC) that produces quantized samples of the output signal at discrete time steps. The quantized samples may then be used by a digital signal processor to infer, such by using a fast Fourier transform, the frequency components of the flicker current, which are related to the frequencies of the flicker in the received ambient light. The ADC and/or the digital signal processor may also be formed on the same semiconductor substrate as the pixel array, or may be formed on a separate chip or substrate, and may be part of other components or processors of an electronic device containing the image sensor.

Additionally and/or alternatively, some embodiments of image sensors may include a light source associated with the pixel array. The light source may be a light-emitting diode (LED), such as a laser LED. In some embodiments, the light source may be embedded in the pixel array, a camera or image sensor may use a single aperture, such as with a lens, both for emission of light from the embedded light source and for receiving ambient light for an image capture operation. In other embodiments, the light source may be a component separate from the pixel array, and may either emit its light through the single aperture, or emit its light through an additional aperture. The light source may be separate from the image sensor and camera, and have its own lens and/or optical system.

The light source may be modulated to provide methods for detection of proximity to an object in the environment of the electronic device. The light source may be modulated with a square wave in which the intensity of its emitted light alternates between a high and low value. The low value need not be a zero intensity, but may be. Reflections of the emitted light may be received on the pixel array, and proximity detection may make use of signals of the FCDC within the pixel array. Either the whole pixel array itself or a set of pixels of the pixel array may be used to detect changes in intensity of received reflections of the emitted light. The detected changes may then be used to infer a proximity to the object.

In other embodiments, the light source may have the intensity of its emitted light modulated with a sinusoid wave. Changes in phase, or of other parameters, between the emitted light and received reflections thereof on the pixel array may be used to infer a time-of-flight, from which proximity to the object may be inferred.

These and other embodiments are discussed below with reference to FIGS. 1A-10B. However, those skilled in the art will readily appreciate that the detailed description given herein with respect to these Figures is for explanatory purposes only and should not be construed as limiting.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Directional terminology, such as "top", "bottom", "upper", "lower", "front", "back", "over", "under", "above", "vertical", "horizontal", "below", "left", "right", etc. is used with reference to the orientation of some of the components in some of the figures described herein. Because components in various embodiments can be positioned in a number of different orientations, directional terminology is used for purposes of illustration and is not always limiting. Directional terminology is intended to be construed broadly, and therefore should not be interpreted to preclude components being oriented in different ways. Also, as used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or one of any combination of the items, and/or one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

Figure 1B:
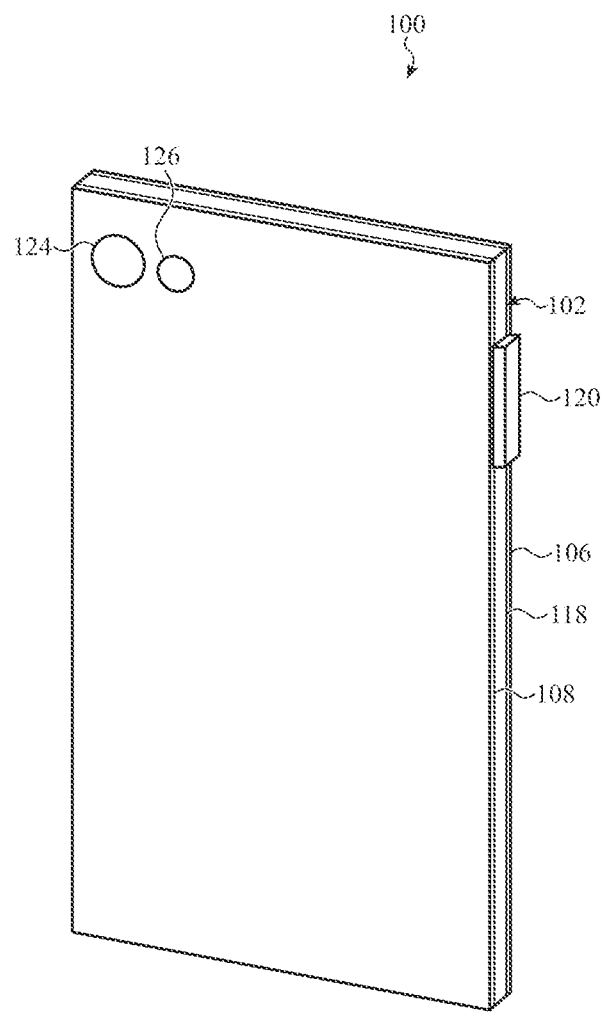

FIGS. 1A and 1B show an example of a device 100 that may include an illumination projector. The device's dimensions and form factor, including the ratio of the length of its long sides to the length of its short sides, suggest that the device 100 is a mobile phone (e.g., a smartphone). However, the device's dimensions and form factor are arbitrarily chosen, and the device 100 could alternatively be any portable electronic device including, for example, a mobile phone, tablet computer, portable computer, audible device, portable music player, wearable device (e.g., an electronic watch, health monitoring device, or fitness tracking device), augmented reality (AR) device, virtual reality (VR) device, mixed reality (MR) device, gaming device, portable terminal, digital single-lens reflex (DSLR) camera, video camera, vehicle navigation system, robot navigation system, or other portable or mobile device. The device 100 could also be a device that is semi-permanently located (or installed) at a single location. FIG. 1A shows a front isometric view of the device 100, and FIG. 1B shows a back isometric view of the device 100. The device 100 may include a housing 102 that at least partially surrounds a display 104. The housing 102 may include or support a front cover 106 that defines a front surface of the device 100, and/or a back cover 108 that defines a back surface of the device 100 (with the back surface opposite the front surface). More generically, the device 100 may include one or more "covers." The front cover 106 may be positioned over the display 104, and may provide a window through which the display 104 may be viewed. In some embodiments, the display 104 may be attached to (or abut) the housing 102 and/or the front cover 106. In alternative embodiments of the device 100, the display 104 may not be included and/or the housing 102 may have an alternative configuration.

The display 104 may include one or more light-emitting elements, and in some cases may be a light-emitting diode (LED) display, an organic LED (OLED) display, a liquid crystal display (LCD), an electroluminescent (EL) display, a thin film transistor (TFT) display, or another type of display. In some embodiments, the display 104 may include, or be associated with, one or more touch and/or force sensors that are configured to detect a touch and/or a force applied to a surface of the front cover 106.

The various components of the housing 102 may be formed from the same or different materials. For example, a sidewall 118 of the housing 102 may be formed using one or more metals (e.g., stainless steel), polymers (e.g., plastics), ceramics, or composites (e.g., carbon fiber). In some cases, the sidewall 118 may be a multi-segment sidewall including a set of antennas. The antennas may form structural components of the sidewall 118. The antennas may be structurally coupled (to one another or to other components) and electrically isolated (from each other or from other components) by one or more non-conductive segments of the sidewall 118. The front cover 106 may be formed, for example, using one or more of glass, a crystal (e.g., sapphire), or a transparent polymer (e.g., plastic) that enables a user to view the display 104 through the front cover 106. In some cases, a portion of the front cover 106 (e.g., a perimeter portion of the front cover 106) may be coated with an opaque ink to obscure components included within the housing 102. The back cover 108 may be formed using the same material(s) that are used to form the sidewall 118 or the front cover 106. In some cases, the back cover 108 may be part of a monolithic element that also forms the sidewall 118 (or in cases where the sidewall 118 is a multi-segment sidewall, those portions of the sidewall 118 that are conductive or non-conductive). In still other embodiments, all of the exterior components of the housing 102 may be formed from a transparent material, and components within the device 100 may or may not be obscured by an opaque ink or opaque structure within the housing 102.

The front cover 106 may be mounted to the sidewall 118 to cover an opening defined by the sidewall 118 (i.e., an opening into an interior volume, in which various electronic components of the device 100, including the display 104, may be positioned). The front cover 106 may be mounted to the sidewall 118 using fasteners, adhesives, seals, gaskets, or other components.

A display stack or device stack (hereafter referred to as a "stack") including the display 104 may be attached (or abutted) to an interior surface of the front cover 106 and extend into the interior volume of the device 100. In some cases, the stack may include a touch sensor (e.g., a grid of capacitive, resistive, strain-based, ultrasonic, or other type of touch sensing elements), or other layers of optical, mechanical, electrical, or other types of components. In some cases, the touch sensor (or part of a touch sensor system) may be configured to detect a touch applied to an outer surface of the front cover 106 (e.g., to a display surface of the device 100).

In some cases, a force sensor (or part of a force sensor system) may be positioned within the interior volume above, below, and/or to the side of the display 104 (and in some cases within the device stack). The force sensor (or force sensor system) may be triggered in response to the touch sensor detecting one or more touches on the front cover 106 (or a location or locations of one or more touches on the front cover 106), and may determine an amount of force associated with each touch, or an amount of force associated with a collection of touches as a whole. In some embodiments, the force sensor (or force sensor system) may be used to determine a location of a touch, or a location of a touch in combination with an amount of force of the touch. In these latter embodiments, the device 100 may not include a separate touch sensor.

As shown primarily in FIG. 1A, the device 100 may include various other components. For example, the front of the device 100 may include one or more front-facing cameras 110, speakers 112, microphones, or other components 114 (e.g., audio, imaging, and/or sensing components) that are configured to transmit or receive signals to/from the device 100. In some cases, a front-facing camera 110, alone or in combination with other sensors, may be configured to operate as a bio-authentication or facial recognition sensor. The device 100 may also include various input devices, including a mechanical or virtual button 116, which may be accessible from the front surface (or display surface) of the device 100. In some embodiments, a virtual button 116 may be displayed on the display 104 and, in some cases, a fingerprint sensor may be positioned under the button 116 and configured to image a fingerprint through the display 104. In some embodiments, the fingerprint sensor or another form of imaging device may span a greater portion, or all, of the display area.

The device 100 may also include buttons or other input devices positioned along the sidewall 118 and/or on a back surface of the device 100. For example, a volume button or multipurpose button 120 may be positioned along the sidewall 118, and in some cases may extend through an aperture in the sidewall 118. In other embodiments, the button 120 may take the form of a designated and possibly raised portion of the sidewall 118, but the button 120 may not extend through an aperture in the sidewall 118. The sidewall 118 may include one or more ports 122 that allow air, but not liquids, to flow into and out of the device 100. In some embodiments, one or more sensors may be positioned in or near the port(s) 122. For example, an ambient pressure sensor, ambient temperature sensor, internal/external differential pressure sensor, gas sensor, particulate matter concentration sensor, or air quality sensor may be positioned in or near a port 122.

In some embodiments, the back surface of the device 100 may include a primary rear-facing camera 124 that includes one or more image sensors (see FIG. 1B). In some cases, the device 100 may have a second imaging sensor 126, which may be an autofocus camera, a telephoto camera, a second camera used in conjunction with the rear-facing camera 124—such as to provide depth or 3D imaging—or another optical sensor. The device 100 may also have a flash or light source that may be positioned on the back of the device 100 (e.g., near the rear-facing camera). In some cases, the back surface of the device 100 may include multiple rear-facing cameras. Either or both the primary rear-facing camera 124 and the second imaging sensor may include a pixel array with embedded flicker current detection circuitry, as described below.

Figure 2:
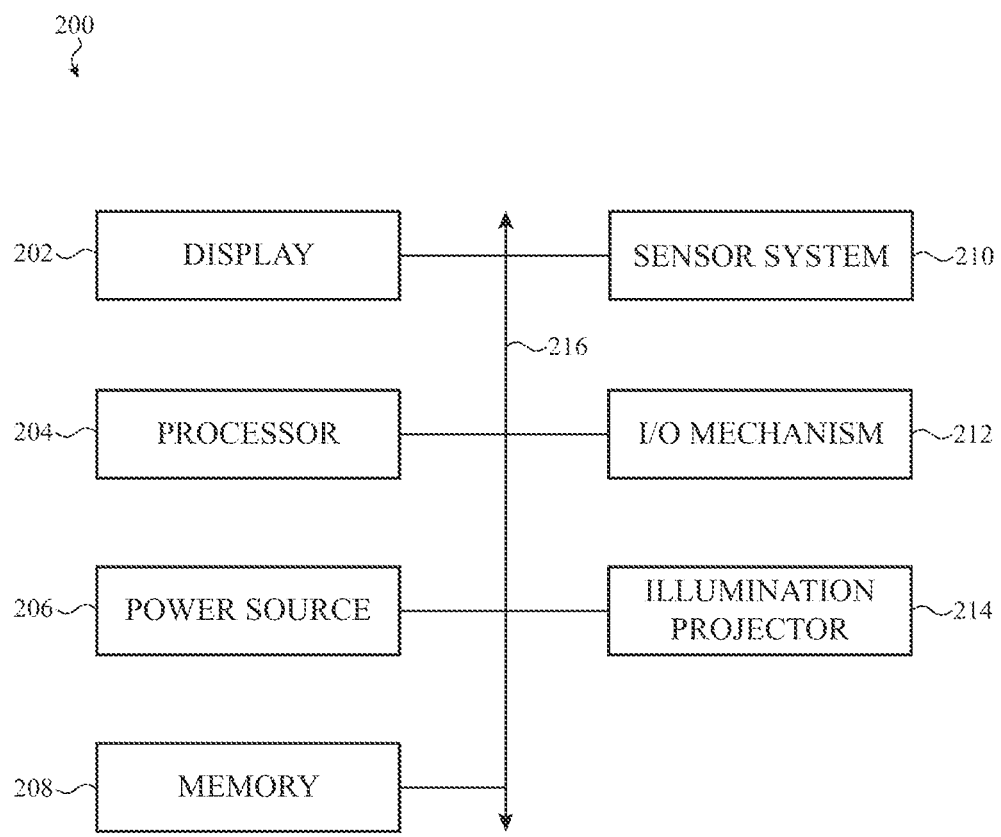
FIG. 2 shows an example block diagram of an electronic device.

FIG. 2 shows an example block diagram of an electronic device 200, which in some cases may be the electronic device described with reference to FIGS. 1A and 1B, or another type of electronic device including one or more of the image sensors having one or more pixel arrays as described herein. The electronic device 200 may include an electronic display 202 (e.g., a light-emitting display), a processor 204, a power source 206, a memory 208 or storage device, a sensor system 210, an input/output (I/O) mechanism 212 (e.g., an input/output device, input/output port, or haptic input/output interface), and/or an illumination projector 214. The processor 204 may control some or all of the operations of the electronic device 200. The processor 204 may communicate, either directly or indirectly, with some or all of the other components of the electronic device 200. For example, a system bus, other bus(es), or other communication mechanism 216 can provide communication between the electronic display 202, the processor 204, the power source 206, the memory 208, the sensor system 210, the I/O mechanism 212, and the illumination projector 214.

The processor 204 may be implemented as any electronic device capable of processing, receiving, or transmitting data or instructions, whether such data or instructions is in the form of software or firmware or otherwise encoded. For example, the processor 204 may include a microprocessor, a central processing unit (CPU), an application-specific integrated circuit (ASIC), a digital signal processor (DSP), a controller, or a combination of such devices. As described herein, the term "processor" is meant to encompass a single processor or processing unit, multiple processors, multiple processing units, or other suitably configured computing element or elements. In some cases, the processor 204 may provide part or all of the processing system or processor described herein.

It should be noted that the components of the electronic device 200 can be controlled by multiple processors. For example, select components of the electronic device 200 (e.g., the sensor system 210) may be controlled by a first processor and other components of the electronic device 200 (e.g., the electronic display 202) may be controlled by a second processor, where the first and second processors may or may not be in communication with each other.

The power source 206 can be implemented with any device capable of providing energy to the electronic device 200. For example, the power source 206 may include one or more batteries or rechargeable batteries. Additionally or alternatively, the power source 206 may include a power connector or power cord that connects the electronic device 200 to another power source, such as a wall outlet.

The memory 208 may store electronic data that can be used by the electronic device 200. For example, the memory 208 may store electrical data or content such as, for example, audio and video files, documents and applications, device settings and user preferences, timing signals, control signals, instructions, and/or data structures or databases. The memory 208 may include any type of memory. By way of example only, the memory 208 may include random access memory, read-only memory, Flash memory, removable memory, other types of storage elements, or combinations of such memory types.

The electronic device 200 may also include one or more sensor systems 210 positioned almost anywhere on the electronic device 200. The sensor system(s) 210 may be configured to sense one or more types of parameters, such as but not limited to, vibration; light; touch; force; heat; movement; relative motion; biometric data (e.g., biological parameters) of a user; air quality; proximity; position; connectedness; surface quality; and so on. By way of example, the sensor system(s) 210 may include a heat sensor, a position sensor, a light or optical sensor, a self-mixing interferometry (SMI) sensor, an image sensor (e.g., one or more of the image sensors or cameras described herein), an accelerometer, a pressure transducer, a gyroscope, a magnetometer, a health monitoring sensor, an air quality sensor, and so on. Additionally, the one or more sensor systems 210 may utilize any suitable sensing technology, including, but not limited to, interferometric, magnetic, capacitive, ultrasonic, resistive, optical, acoustic, piezoelectric, or thermal technologies.

In particular, the sensor system(s) 210 of the electronic device 200 may include one or more cameras, or other types of image sensors or active optical sensors, that include pixel arrays having embedded flicker current detection circuitry or components as described herein, and which may be operated or controlled, such as by the processor 204.

The I/O mechanism 212 may transmit or receive data from a user or another electronic device. The I/O mechanism 212 may include the electronic display 202, a touch sensing input surface, a crown, one or more buttons (e.g., a graphical user interface "home" button), one or more microphones or speakers, one or more ports such as a microphone port, and/or a keyboard. Additionally or alternatively, the I/O mechanism 212 may transmit electronic signals via a communications interface, such as a wireless, wired, and/or optical communications interface. Examples of wireless and wired communications interfaces include, but are not limited to, cellular and Wi-Fi communications interfaces.

The illumination projector 214 may be configured as described with reference to FIGS. 1A and 1B and elsewhere herein, and in some cases may be integrated or used in conjunction with one or more of the sensor system(s) 210. For example, the illumination projector 214 may illuminate an object or scene, and light that reflects or scatters from the object or scene may be sensed by a light or optical sensor, an SMI sensor, or an image sensor (e.g., one or more of the image sensors or cameras described herein). In some embodiments, an illumination projector 214 may be part of a sensor system 210.

Figure 3A:
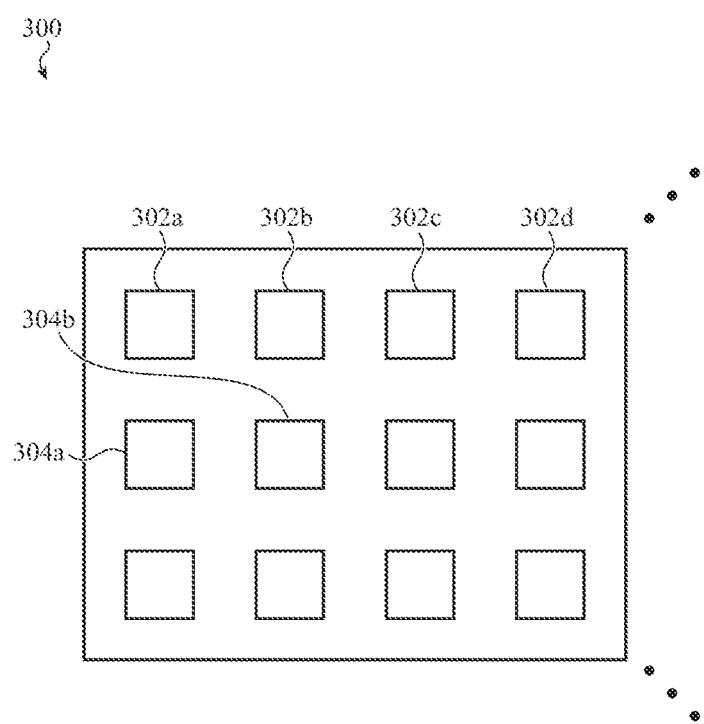
FIG. 3A illustrates an example layout of a pixel array.

FIG. 3A shows a plan view (e.g., a top view) of a section of a pixel array 300 that may be a component of an optical sensor, such as the camera 124 or the imaging sensor 126. The pixel array 300 may be configured as a rectangular array, with a first row containing the individual pixels 302a-d. A second row of the pixel array 300 includes the pixel 304a in the same column as pixel 302a of the first row, and pixel 304b in the same column as pixel 302b of the first row. The rows and columns of the pixel array 300 may extend to form an M×N array of M rows and N columns, for M and N large integers. In some embodiments, M and N may be on the order of $10^3$ or more. One skilled will recognize that, in other embodiments, alternate geometric configurations for the pixels of pixel array 300 are possible, such as a hexagonal array of pixels arranged in an area-filling configuration with shifted rows. The pixel array 300 may include embedded flicker current detection circuitry or components, as described herein. The pixel array 300, and the pixel arrays as described herein, may be formed or configured either to be as backside illuminated or frontside illuminated. However, as these terms refer how the semiconductor chip containing the pixel array is fabricated, herein the terms 'on' or 'opposite' to a 'light-receiving side' will be used.

Figure 3B:
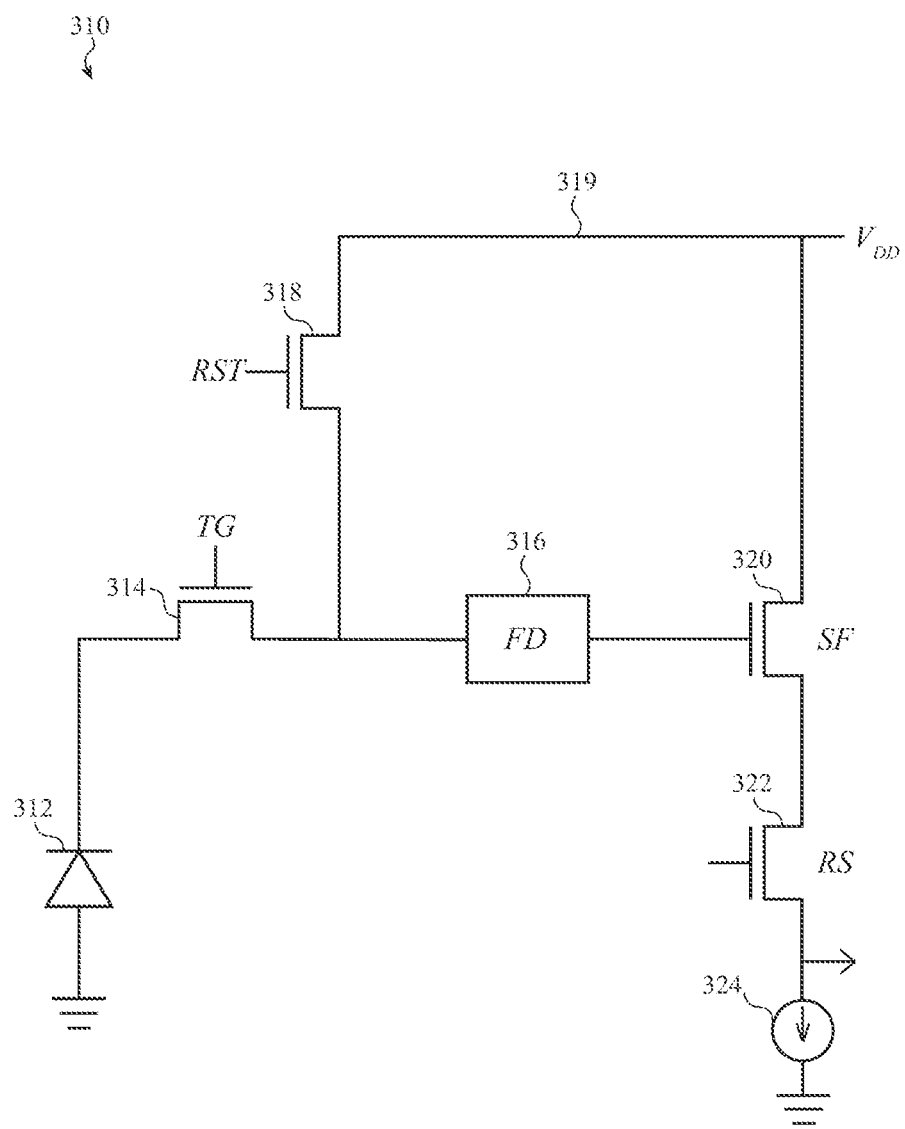
FIG. 3B shows example circuit elements of a pixel.

FIG. 3B shows an example equivalent circuit of certain electrical components and configurations of a pixel 310, such as may be part of the pixel array 300. One skilled in the art will recognize that a pixel of the embodiments of pixel arrays described herein may have alternate configurations. Also, one skilled in the art will recognize that the various transistors of the pixels shown and described below may be implemented in any of various NMOS, PMOS, or CMOS semiconductor technologies. For simplicity of description, the following descriptions will be for pixels and pixel arrays implemented in CMOS technologies.

The pixel 310 includes a semiconductor photodiode (PD) 312. The pixel array 300 containing the pixel 310 may be configured within a camera or image sensor of an electronic device, such as camera 124 or image sensor 126 of electronic device 100 described above, so that light from the environment, such as during an image capture operation, is received on the pixel array 300, and on the photodiode 312 in particular. The photons of the light received on the PD 312 induce charge carriers, which may be either electrons or holes, to accumulate within the PD 312 during an exposure period of the image capture operation.

The transfer gate (TG) transistor 314 may be configured (by the appropriate voltage applied at its gate) as 'off' or 'open circuit' during the exposure period. At the end of the exposure period, the TG transistor 314 may be triggered as 'on' or 'closed circuit' (another corresponding voltage applied to its gate), to allow the accumulated charge carriers to flow to the floating diffusion node (FD) 316. The TG transistor 314 may then be returned to the 'open circuit' state, such as at the conclusion of the exposure period. A reset (RST) transistor 318, when closed by the appropriate voltage applied to its gate, may provide a path for light-generated charges to be cleared into the supply voltage line $V_{DD}$ 319.

The pixel 310 includes at least two readout circuit elements: the source follow (SF) transistor 320 and the row select (RS) transistor 322 connected in a cascode structure, with the source of the RS transistor connected to the current source 324. During a readout operation of the pixel array, the RS transistor 322 may be triggered so that the light-generated charge at the FD node 316 may cause a corresponding signal in the output of the SF transistor 320. The output signal of pixels for the image capture operation may then be taken from the source of the RS transistor 322.

Figure 4A:
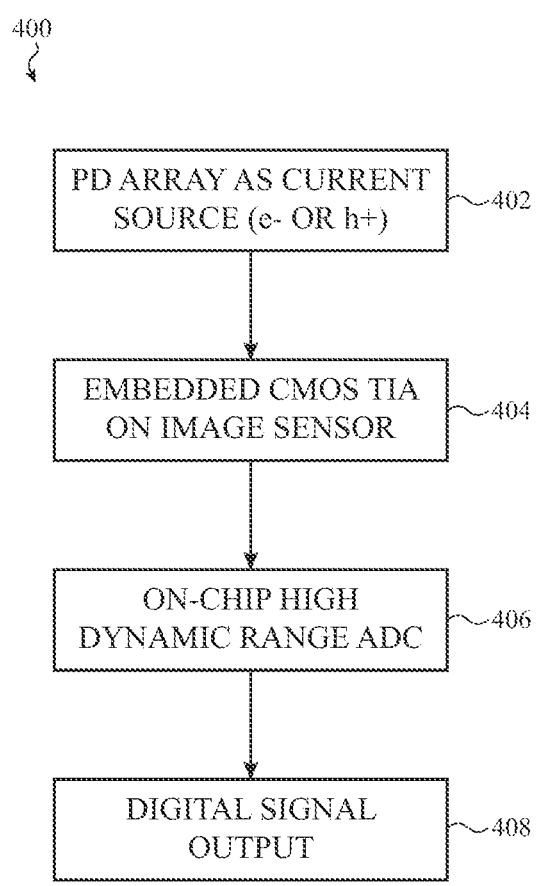
FIG. 4A shows a flow chart of a method of flicker detection, according to an embodiment.

FIG. 4A is a flow chart of an exemplary operation 400 for detecting flicker in an ambient light of the environment of an image sensor that contains a pixel array, such as a pixel array with pixels as described in relation to FIGS. 3A and 3B. The operation for detecting flicker may take place prior to an image capture operation so that appropriate compensation techniques may be applied during the image capture operation.

At stage 402 of the flicker detection operation 400, output elements of a set of pixels of the pixel array is disabled so that little or no light-generated charge carriers flow to image signal output connections of the pixels in the set of pixels. The set of pixels of the pixel array may be either all the pixels of the pixel array, or alternatively, a proper subset of all the pixels of the pixel array. For example, for the case of the pixel 310, in some embodiments the disabled output elements include the RS transistor 322 and the SF transistor 320, but the TG transistor 314 is closed to allow light-generated charge carriers to flow through the RST transistor 318 and be detected, as described below. In this way, the light-generated charge carriers of the set of pixels of the pixel array used for flicker detection may operate as a single current source of the flicker detection operation 400. Depending on which of the various embodiments described below is used to detect the current, the detected light-generated charge carriers may be either holes ($h^+$) or electrons ($e^-$). Using multiple pixels in the set of pixels as a single photocurrent source may improve the signal-to-noise ratio by averaging the variation in charge carrier generation of each pixel, as well as noise due to thermal charge carrier generation and other noise sources.

At stage 404, a transimpedance amplifier (TIA) receives the combined currents from the set of pixels of the pixel array of the image sensor. In various embodiments, the TIA may be fabricated or formed on the same semiconductor wafer or chip as the pixel array. This may allow the pixel array to be used, either concurrently or non-concurrently, both for flicker detection as well as image capture. Also, having the TIA on the same semiconductor chip as the pixel array may allow for an electronic device with the image sensor to avoid the need for a separate light sensor dedicated to flicker detection.

The TIA may function to produce an output signal related to the received combined currents of the set of pixels. The output signal may be a voltage, current, or other parameter signal, and have sufficient strength to drive subsequent components that provide analysis of the signal or signals within the combined currents.

At stage 406, a high dynamic range analog-to-digital converter (ADC) receives an output signal of the TIA and produces digital output values at discrete time intervals. The sampling time period, $T_S$, is taken to satisfy the Nyquist criterion of being at least twice the expected highest frequency component in the output signal of the TIA. As an example, fluorescent lights flicker at approximately 120 Hz, so the sampling frequency should be at least 240 Hz, or higher, to include harmonics or for better resolution. If flicker in the ambient light is expected to be from sources with a higher flicker frequency, the sampling frequency of the ADC may be chosen accordingly. In some embodiments, the sampling frequency of the ADC may be adjustable. The ADC may be on the same semiconductor chip as the pixel array and TIA, or may be a separate component, or part of another system, such as a processor.

At stage 408, the number of bits used for the digital output values of the ADC may be chosen based on the expected strength of the flicker signal and also the ambient light. The number of bits may be adjustable in operation. The digital output signal of the ADC may then be used, such as by a digital signal processing (DSP) unit, to determine the presence or strength of a flicker signal in the ambient light. The DSP unit may be on the same semiconductor chip as the pixel array and FCDC, a component of the image sensor, or a separate component. The DSP may be able to perform various signal processing functions, such as fast Fourier transforms and filtering, which may be performed in hardware sections, or by received programs, such as in a field programmable gate array section. The DSP may a component of a processing unit of the electronic device that controls multiple aspects of image capture and user interface operations.

Figure 4B:
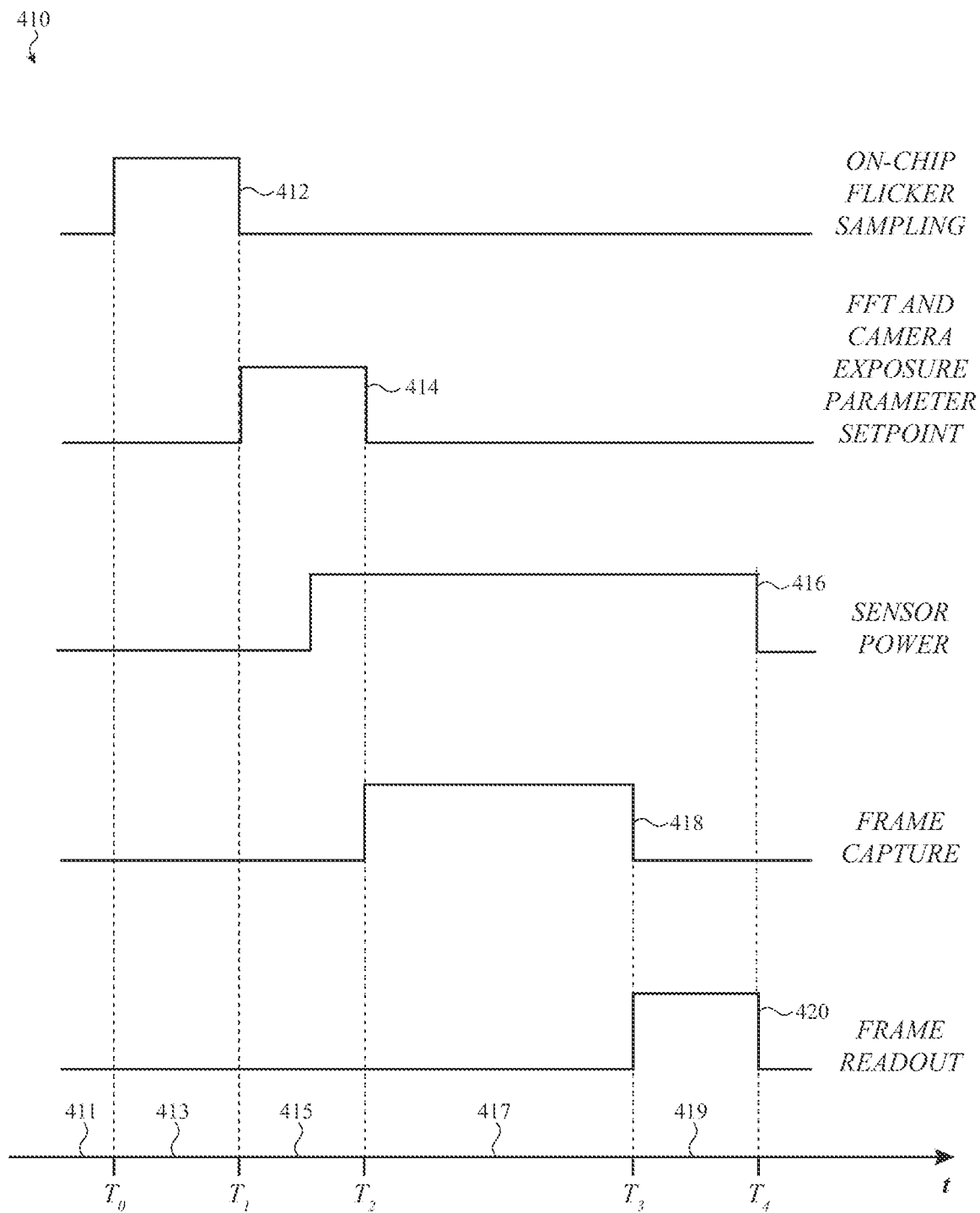
FIG. 4B shows a timing diagram of a method for flicker detection, according to an embodiment.

FIG. 4B shows a time sequence 410 of enabling signals with respect to the time axis 411 that show a flicker detection operation, such as the flicker detection operation 400, used in conjunction with an image capture operation.

In the first time interval 413 from time $T_0$ to $T_1$, the set of pixels of the pixel array and/or the FCDC is enabled by the flicker sampling enable signal 412 to perform flicker current detection. During the first time interval 413, other operations may be disabled.

In the second time interval 415 from time $T_1$ to $T_2$, a flicker processing signal 414 enables digital signal processing, such as an FFT and determination of exposure parameters of the camera, to occur on the quantized and sampled output of the ADC. The results, such as flicker frequencies or other parameters, may be used during the start of the image sensor power signal 416 that prepares the image sensor for an image capture operation. The image sensor power signal 416 may begin after the end of the flicker processing signal 414 at time $T_1$ and before the time $T_2$, and continues until the end of the image capture operation at time $T_4$.

In the third time interval 417 from time $T_2$ to $T_3$, a frame capture signal 418 enables the pixel array to obtain an image frame. The captured image frame may be a frame in a video sequence. The image capture operation may use a rolling shutter or global shutter operation applied to the pixel array.

In the fourth time interval 419 from time $T_3$ to $T_4$, a frame readout enabling signal 420 enables readout circuitry of a pixel array to obtain receive readouts, such as of light-generated charges, from the pixels of the pixel array, that may be used to produce the total image.

Figure 5A:
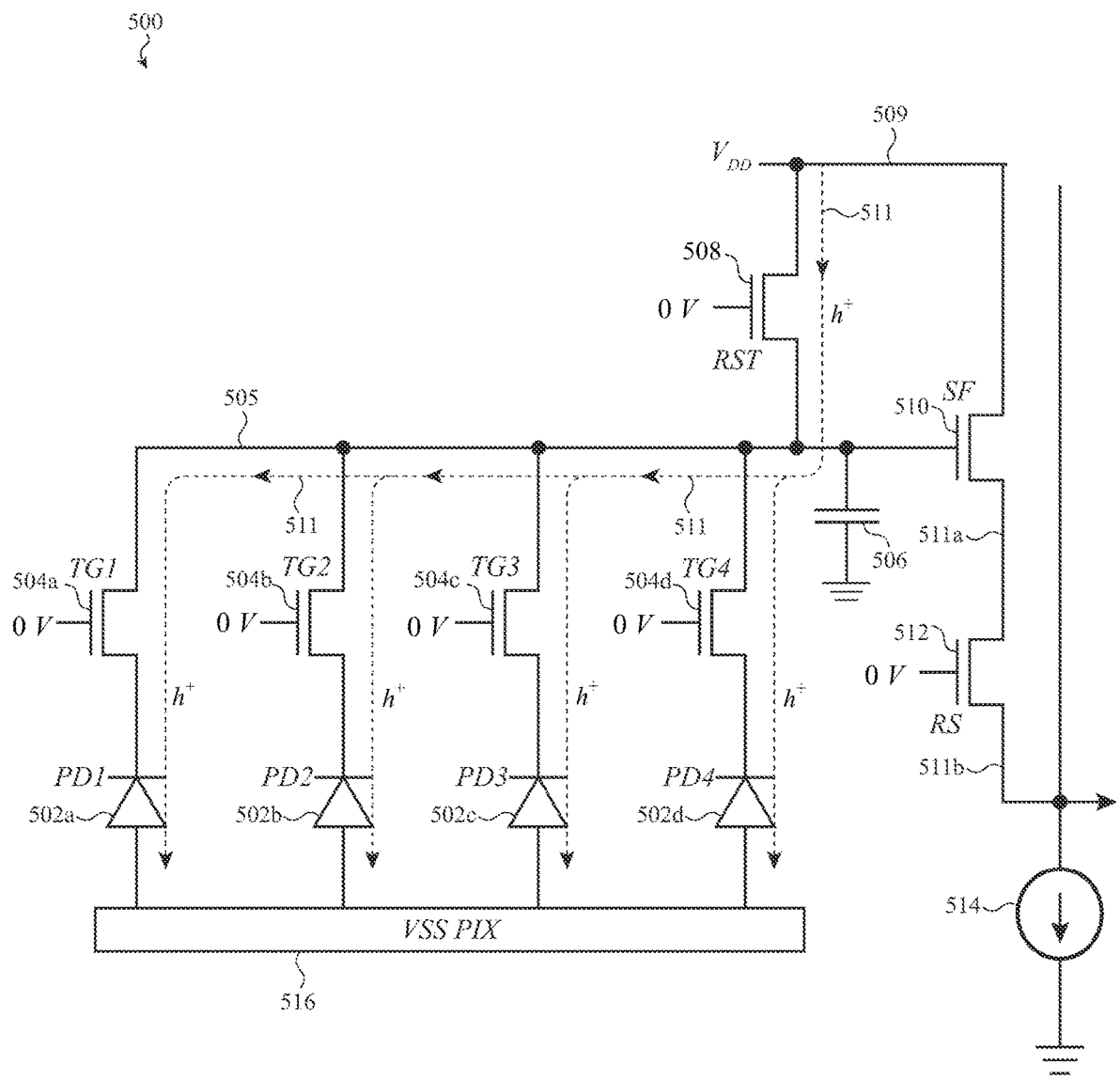
FIG. 5A shows a circuit diagram and current flow during a flicker detection operation, according to an embodiment.

FIG. 5A shows an exemplary equivalent circuit diagram 500 for either a single pixel in which there are four PDs, PD1-4, 502a-d, or for four pixels with a common connection 505. In the former case, there may be a common reset transistor (RST) 508 with the drain connected to the supply voltage $V_{DD}$ 509, a common charge storage capacitor 506, which may be a common FD node, connected to the gate of a common source follower transistor (SF), and a common row-select (RS) transistor with the drain connected to the SF transistor 510. In the latter case, for each pixel, there may be an individual respective RST transistor, FD node, SF transistor, and RS transistor for each pixel. Each of PD1-4, 502a-d, has its cathode connected to a respective transfer gate (TG) transistor 504a-d, which control the flow of charges onto the storage capacitor(s) 506.

During a readout stage of an image capture operation, light-generated charges captured in PD1-4, 502a-d, and transferred over the connection line to the charge storage capacitor(s) 506 can induce a related output current from the source of the SF transistor 510 through the connection line 511a into the drain of the RS transistor 512 and onto the output signal line 511b. The related output current may be buffered or amplified by the system readout circuitry 514.

In the bias configuration shown in FIG. 5A, the RS transistor 512 has its gate biased at a low voltage so that little or no current flows onto the output signal line 511b. Instead, the gate of the RST transistor 508 and the TG transistors 504a-d are set low. In this bias configuration, light-generated charge carriers collected from the PDs 502a-d are holes, and flow to respective in-pixel anode or cathode connections, which may be at a ground, as described in relation to FIGS. 6A-C and FIGS. 7A-B. This hole current flow 511 is to the receiving connection $V_{SS\_PIX}$ 516. In the bias configuration of FIG. 5A, the pixel array may also be used for concurrent capture of an image and for flicker detection.

Figure 5B:
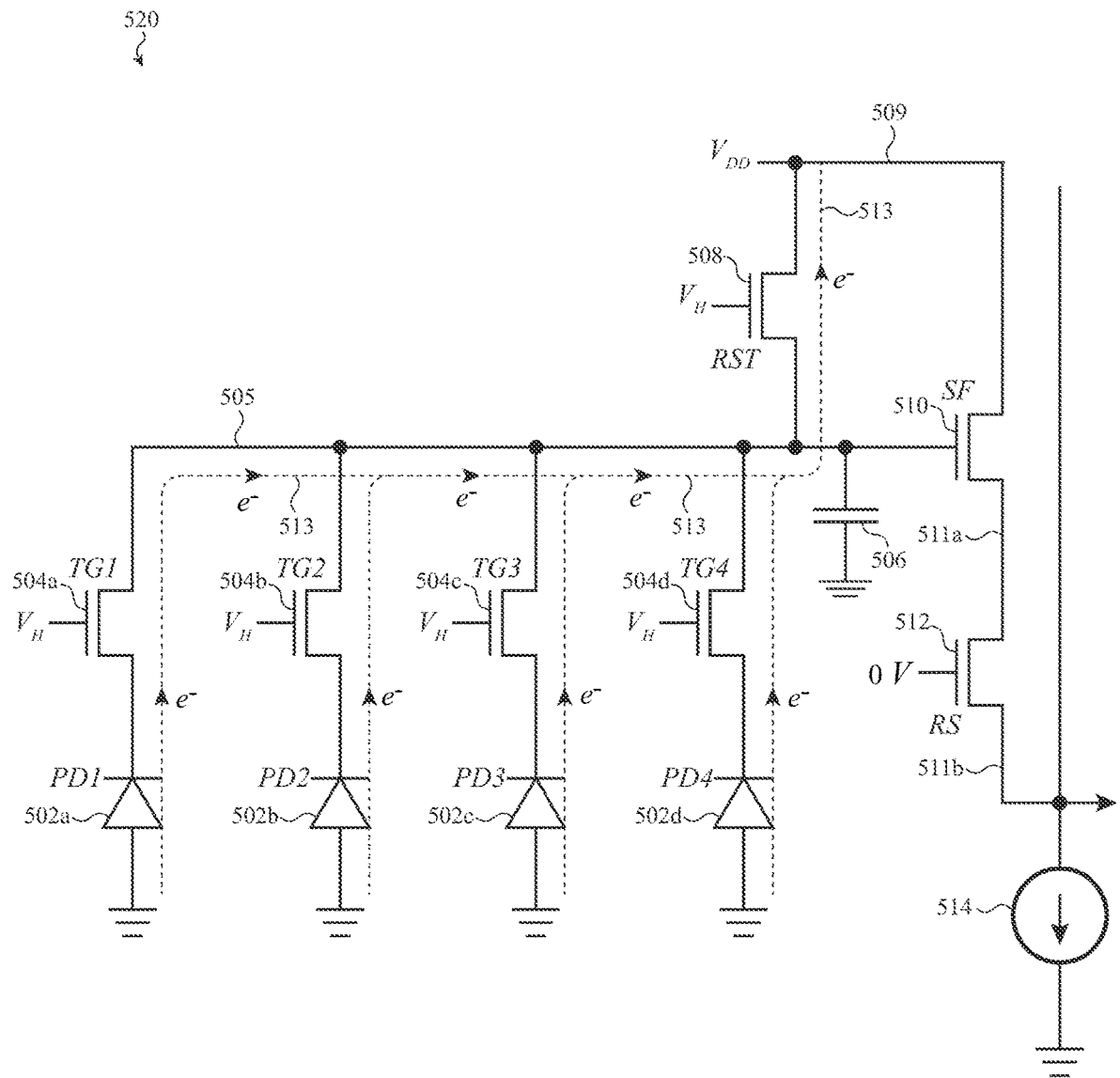
FIG. 5B shows a circuit diagram and current flow during a flicker detection operation, according to an embodiment.

FIG. 5B shows an exemplary equivalent circuit diagram 520 for either a single pixel in which there are four PDs, PD1-4, 502a-d, or for four pixels with a common connection 505. Like numbered components are as described in FIG. 5A. In the bias configuration shown in FIG. 5B, the RS transistor 512 has its gate still biased at a low voltage so that little or no current flows onto the output signal line 511b. Instead, in this alternate bias configuration, the gate of the RST transistor 508 and the TG transistors 504a-d are set to a high voltage $V_H$. In this bias configuration, the light-generated charge carriers in the PDs 502a-d are electrons, and the resulting electron current flow is to the drain of the RST transistor 508 and then to the supply voltage $V_{DD}$ 509.

Figure 5C:
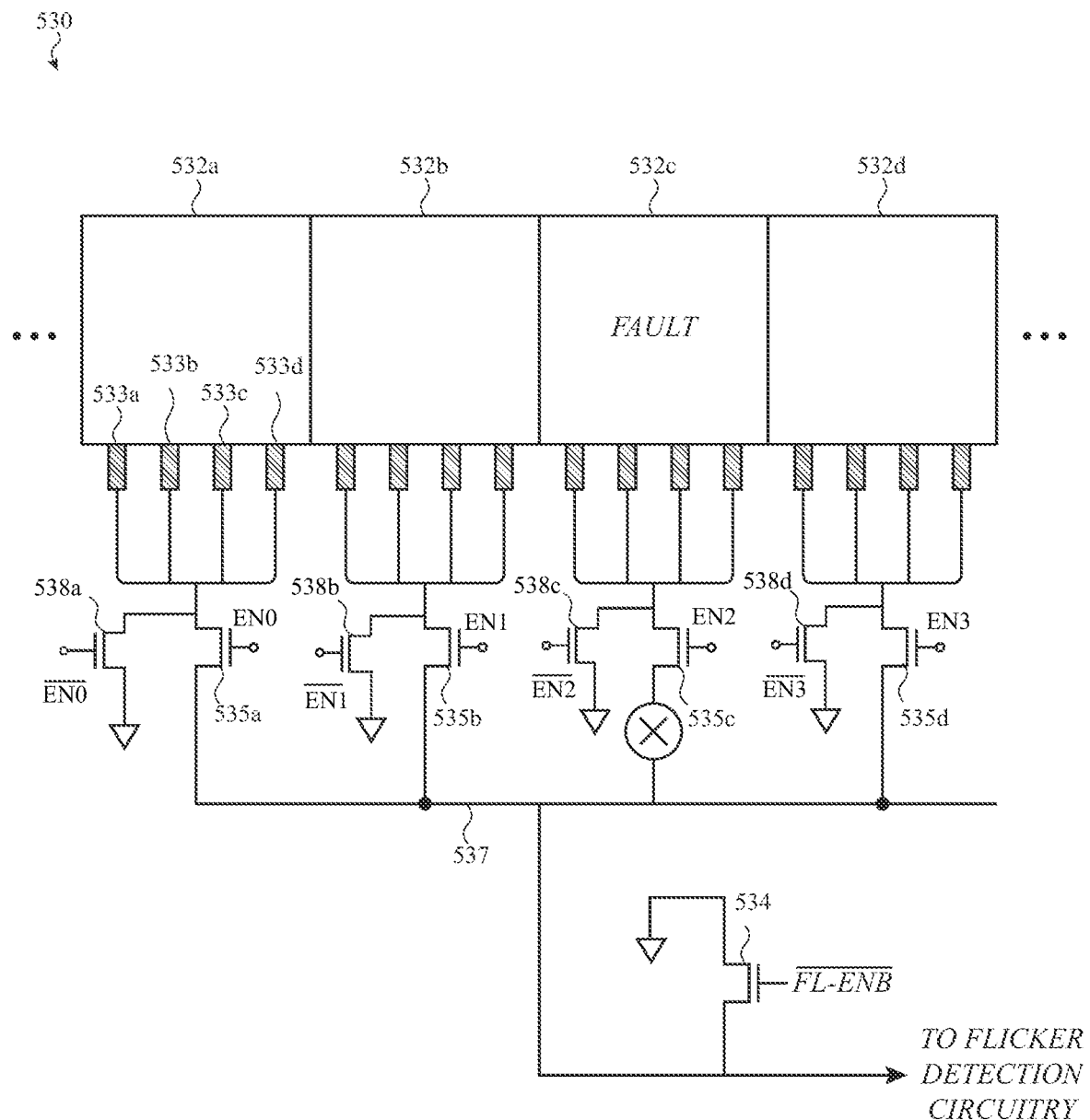
FIG. 5C illustrates connections of a pixel array for flicker detection, according to an embodiment.

FIG. 5C shows a circuit diagram 530 for an exemplary connection of the set of pixels of a pixel array to FCDC. For discussion purposes, four rows of pixels 532a-d are indicated, though embodiments may contain more, and individual connections 533a-d connect to four pixels of the row 532a. Similar considerations apply to rows 532b-d. During a flicker current detection operation, the pixels of the row 532a are enabled to produce currents from light-generated charges in the PDs, which may be either holes as described in relation to FIG. 5A, or electrons as described in relation to FIG. 5B. Each of rows 532a-d may connect to respective complementary pairs of control transistors 535a-d and 538a-d, which may function to allow currents from the pixels of the respective rows to flow either to the FCDC or be shunted to ground. An FCDC enabling transistor 534 may disable current flow to the FCDC except during a flicker detection operation.

In the situation of FIG. 5C, a fault or other problem has occurred in one or more pixels of the row 532c, leading to currents from one or more pixels in row 532c to exceed a fault indication threshold value. From design considerations or initial testing, a range of expected values for the light-generated current from the pixels in a row may be known, so values outside the range may indicate a fault, such as a short circuit. Light-generated current values outside the expected range may mask variations in the light-generated current due to flicker in the ambient light. In such a situation the gate of the control transistor 535c may be turned off to prevent current flow to the FCDC during a flicker detection operation. An image sensor or electronic device may test a pixel array for faults on a periodic basis.

During a flicker detection operation, light-generated currents from the fault-free rows are combined at the common connection point 537 into a single current termed herein the 'flicker current.' The FCDC enabling transistor 534 is then disabled to allow the flicker current to be transmitted to the FCDC.

Figure 6A:
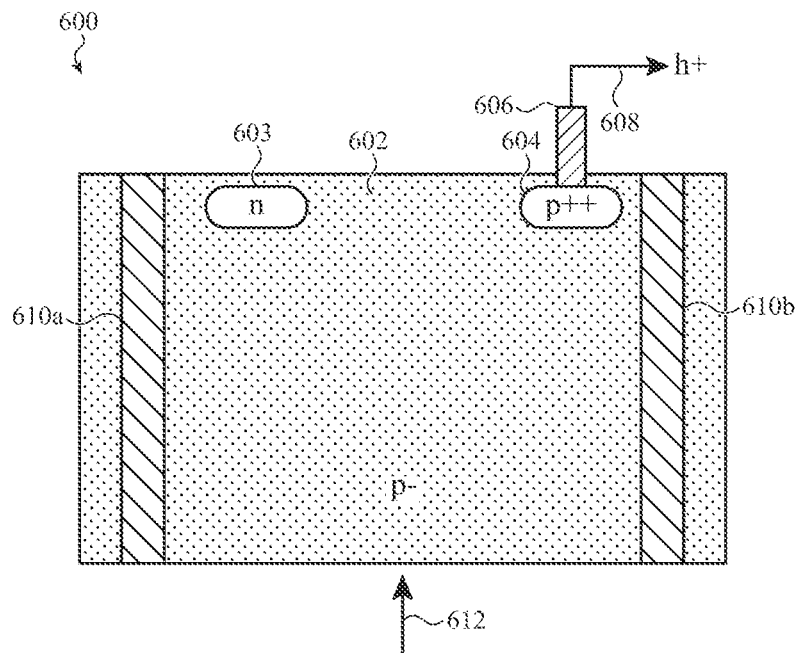
FIGS. 6A and 6B show cross-sectional views of photodiode sections within pixels of a pixel array, according to an embodiment.
Figure 6B:
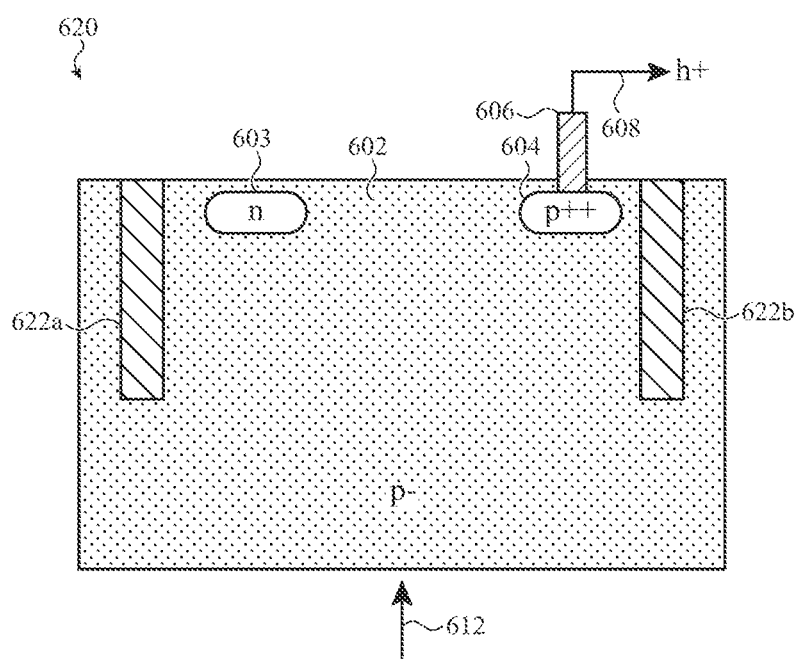
Figure 6C:
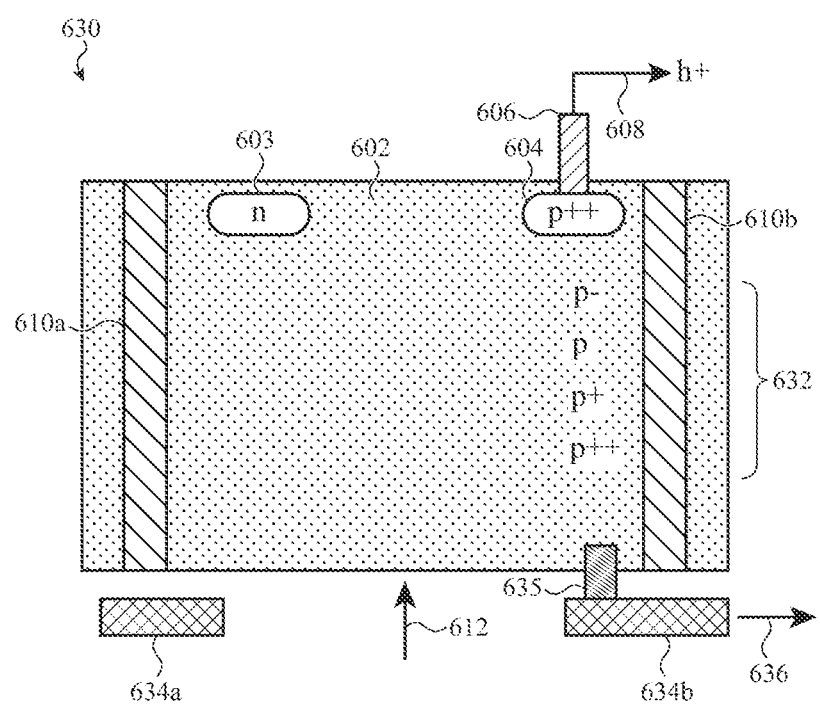
FIG. 6C shows a cross-sectional view of a photodiode section within a pixel of a pixel array and an electrical connection grid, according to an embodiment.

FIGS. 6A-C show cross-sections of respective embodiments of PDs 600, 620, and 630, of pixels that may be included in pixel arrays operable for flicker detection operations described herein.

FIG. 6A shows a cross-section of a PD 600 of a pixel, such as may be a pixel of a pixel array with FCDC. Other components of the pixel, such as the various in-pixel transistors, are not shown for simplicity of explanation. The PD 600 is formed in a lightly p-type doped substrate 602, forming the cathode region of the PD 600. An n-type doped section 603 may be formed in the substrate 602, such as by deposition, to form the anode of the PD 600. The pixel with PD 600 is electrically isolated from other pixels in the pixel array by deep trench isolation (DTI) walls 610a-b. One skilled in the art will recognize that the DTI walls 610a-b may be connected and surround the pixel with PD 600.

Additionally, for flicker current detection based on holes as described in relation to FIG. 5A, an additional heavily doped p-type section 604 may be formed in the substrate 602. The heavily doped p-type section 604 is connected to ground contact 606. Charge carriers in the PD 600 generated by received light 612, which are holes in the bias configuration of FIG. 5A, are collected at the heavily doped p-type section 604 and flow to and then through the ground contact 606. The hole current 608 is then received by the FCDC.

FIG. 6B shows a cross-section of a PD 620 of a pixel with an alternative embodiment of the PD 600 of FIG. 6A. The PD 620 instead is formed with shallow trench isolation (STI) walls 622a and 622b. The STI walls 622a-b may be connected and surround the components of the pixel containing the PD 620 to provide electrical isolation from other pixels of the pixel array. The other indicated regions and components of the PD 620 shown in FIG. 6B are as described above in relation to FIG. 6A.

FIG. 6C shows a cross-section of a PD 630 with an alternative embodiment of the PD 600 of FIG. 6A. The elements of the PD 630 with like numbers to those of FIG. 6A are as described for the PD 600 of FIG. 6A. The PD 630 is formed with a doping gradient 632 of p-type doping increasing toward the light receiving side. The doping gradient 632 may provide passivation and may improve charge transfer.

The pixel that includes the PD 630 is connected to a metallic grid, with cross-sections of grid lines 634a and 634b shown, on the light-receiving side of the pixel array. The metal of the metallic grid may be tungsten in some embodiments. The metallic grid may serve to reduce crosstalk in pixel arrays configured for red-green-blue (RGB) color reception. An interlayer dielectric (not shown for clarity) may separate the grid lines 634a and 634b from the substrate 602 of the pixel array. A via 635 provides electrical contact between the grid line 634b and the region of the PD 630 of highest p-type doping. During a flicker current detection operation, the grid line 634b may receive some of the light-generated holes 636, but hole current 608 may still be collected at the heavily p-type doped section 604.

Figure 7A:
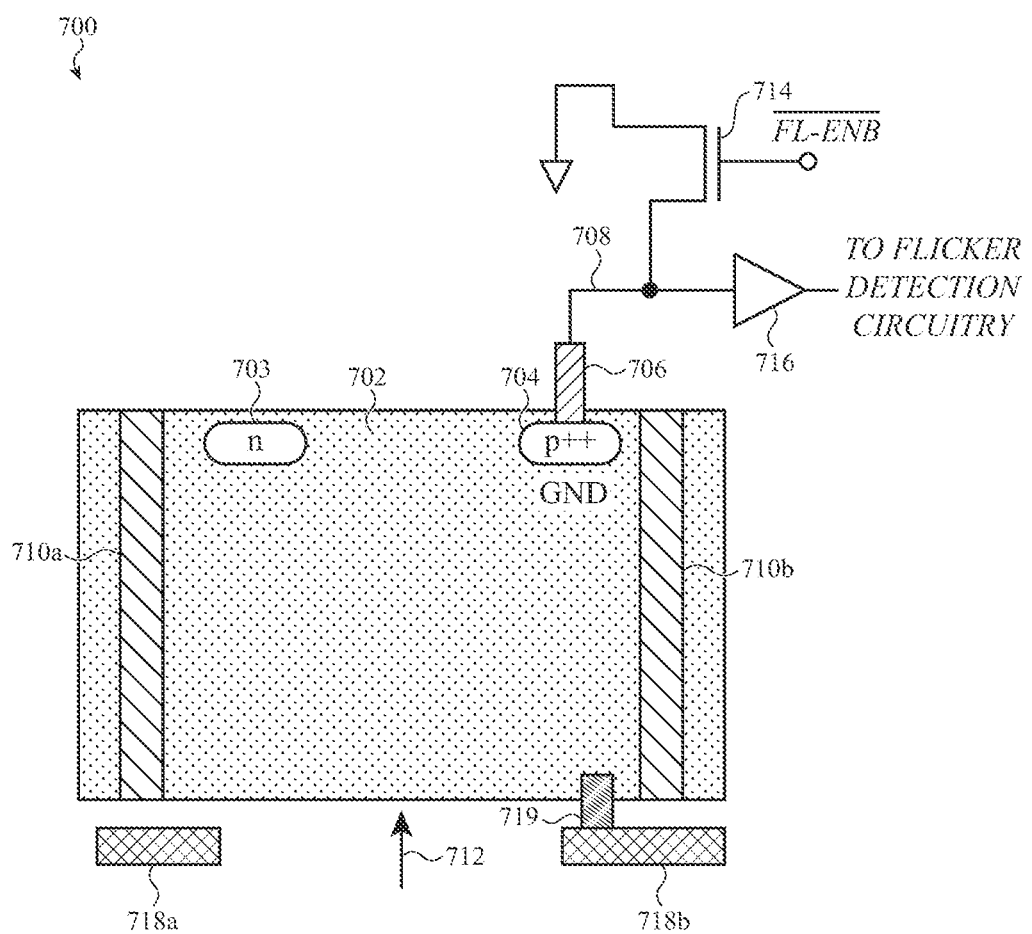
FIGS. 7A and 7B show cross-sectional views of photodiode sections within pixels of a pixel array and electrical connections for flicker detection, according to an embodiment.
Figure 7B:
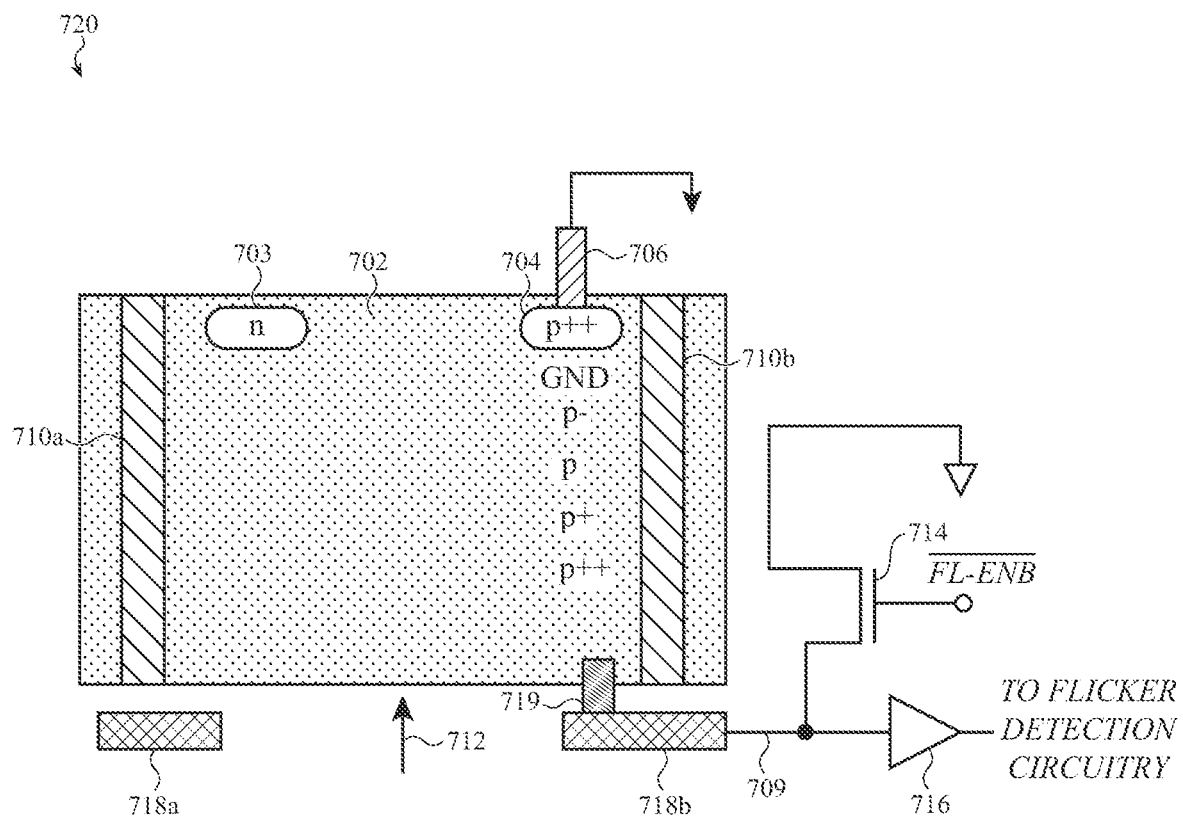

FIGS. 7A and 7B show two configurations 700 and 720 for connection of a PD section of a pixel to components of a FCDC. The two configurations each allow for the pixel to be operated either for image capture and for flicker detection.

The configuration 700 of FIG. 7A shows a cross-section of a PD region of a pixel that is included in a pixel array having embedded FCDC. The configuration 700 is based on the embodiment described in relation to FIG. 6A. The pixel is formed in a p-type doped substrate 702, which may be part of a common semiconductor substrate of the pixel array, and that also forms the cathode section of the PD region of the pixel. An n-type doped region 703 forms the anode region of the PD, and is connected to output circuit elements of the pixel, such as a TG transistor (not shown in the cross-section view of FIG. 7A). The pixel has an additional heavily p-type doped region 704. The heavily p-type doped region 704 is connected to ground contact 706. Charge carriers are generated in the PD section of the pixel when illuminated by received light 712. In the bias configuration of FIG. 5A, holes are collected at the heavily doped p-type section 704, and flow to and then through the ground contact 706. There are DTI walls 710a and 710b which may be connected and surround the pixel to provide electrical isolation from other pixels of the pixel array.

In the configuration 700, the pixel array is also connected to a metallic grid with grid lines 718a and 718b. The metallic grid lines 718a and 718b may be as described in relation to the metallic grid lines 634a-b of FIG. 6C, and may be separated from the substrate 702 by an interlayer dielectric material (not shown for clarity). The metallic grid line 718b connects to the substrate 702 through the via 719.

During an image capture operation, a flicker disable transistor 714 allows the current 708 to flow to ground. But during a flicker current detection operation, the flicker disable transistor 714 is gated open so that light-generated current 708 is then received at the transimpedance amplifier 716. The current 708 may be combined with currents from a set of pixels of the pixel array to form the net flicker current for the net input to the transimpedance amplifier 716. The flicker disable transistor 714, the transimpedance amplifier 716, and other elements of the FCDC may be embedded in the common semiconductor substrate 702 of the pixels of the pixel array.

The configuration 720 of FIG. 7B shows a cross-section of a PD region of a pixel that is included in a pixel array having embedded FCDC. The configuration 720 is a variation of the embodiment described in relation to FIG. 7A with like numbered elements as described in relation to FIG. 7A. But in the configuration 720 of FIG. 7B, the PD region has a p-type doping gradient as described in relation to FIG. 6C.

In the configuration 720, during a flicker current detection operation, the FCDC receives the flicker current 709 induced in the PD region by received light 712 through the metallic grid, with the metallic grid lines 718a and 718b, positioned on the light-receiving side of the pixel array. In the configuration 720, the flicker disable transistor 714 functions as described in relation to FIG. 7A either to shunt the flicker current 709 from the input of the transimpedance amplifier 716, or to allow it to be joined with other flicker currents of a set of pixels of the pixel array as an input to the transimpedance amplifier 716.

Figure 7C:
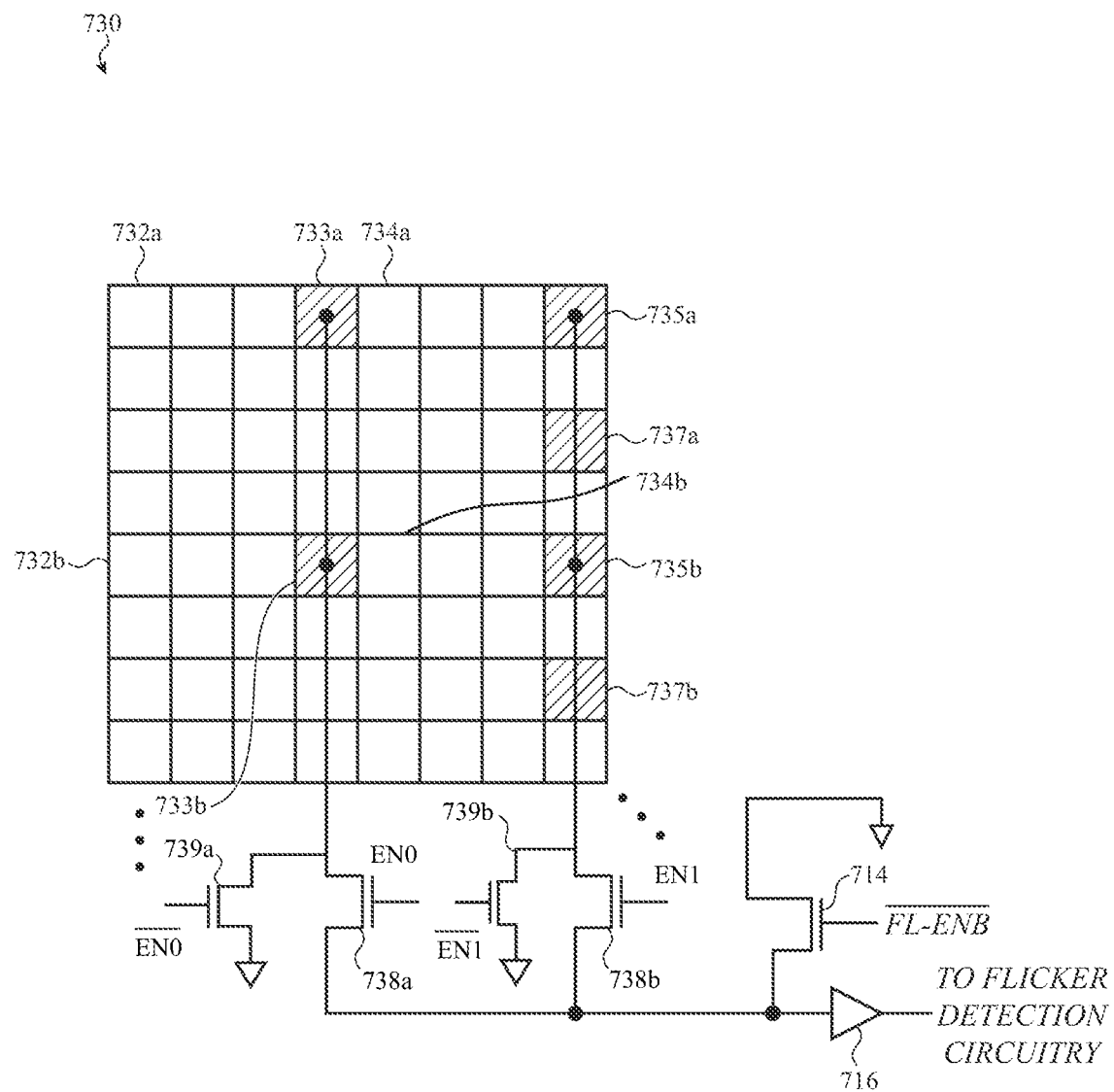
FIG. 7C shows a plan view of a pixel array with connections and circuitry for flicker detection, according to an embodiment.

FIG. 7C shows a configuration 730 in which a certain set of pixels of a pixel array is connected to act as a common current source for input to the transimpedance amplifier 716 of the FCDC. The complementary pairs of control transistors 738a-b and 739a-b, as well as flicker disable transistor 714 control the current input to the transimpedance amplifier 716. In the configuration 730, only a proper subset of the pixels of the pixel array is connected to provide flicker current to the transimpedance amplifier 716.

In the configuration 730, there are four 4-by-4 blocks of pixels: block 732a in the upper left, block 732b in the lower left, block 734a in the upper right, and block 734b in the lower right. In the configuration 730, in each of the 4-by-4 blocks 732a-b and 734a-b, only the pixels in the upper right most position, pixels 733a, 733b, 735a, and 735b respectively, are connected as inputs to the transimpedance amplifier 716 and other FCDC components.

In a modification of the configuration 730, to provide greater separation between pixels connected to the FCDC, pixels 737a and 737b may be connected in place of pixels 735a and 735b. Other selection patterns for the set of pixels of the pixel array to be connected to the FCDC may be used.

Figure 8A:
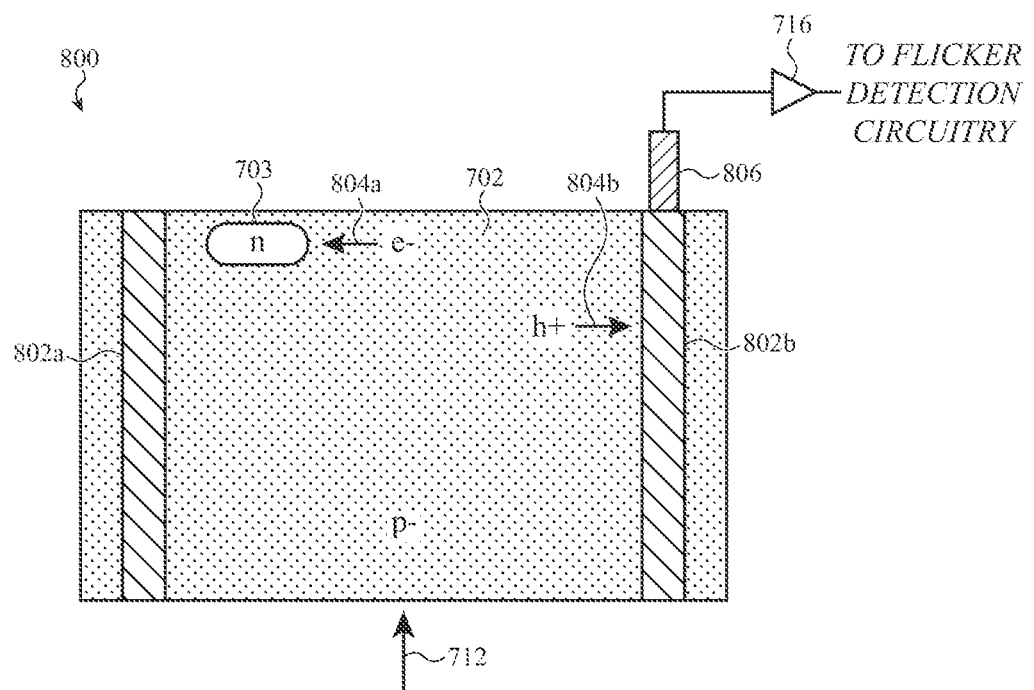
FIG. 8A shows a cross-sectional view of a photodiode section within a pixel of a pixel array with electrical connections at deep trench isolation walls, according to an embodiment.

FIG. 8A shows a cross-section of a PD 800, such as may be included in a pixel of a pixel array with embedded FCDC. The PD 800 is a variation of the PD 700 of FIG. 7A, except that in place of the additional region of heavily doped p-type in-pixel ground connection 704, the DTI walls 802a-b are formed of a conductive material to function as a ground connection. As with the PD 700, the DTI walls 802a-b may be connected and surround some or all of the pixels containing the PD 800, which may provide electrical isolation from other pixels of the pixel array. The PD 800 is formed in weakly doped p-type semiconductor substrate 702 as the cathode and includes an n-type doped region 703 forming the anode, as described above with respect to the PD 700 of FIG. 7A. The capacitively coupled ground connection 806 joins directly with the DTI walls 802a-b.

Photons of the received light 712 generate both electrons 804a and holes 804b. The former flow under the applied bias to the n-type doped region 703. The latter flow to the DTI walls 802a-b and then through the capacitively coupled ground connection 806. The current through the capacitively coupled ground connection 806 may then become part of the flicker current and be received at the FCDC, as described above.

Figure 8B:
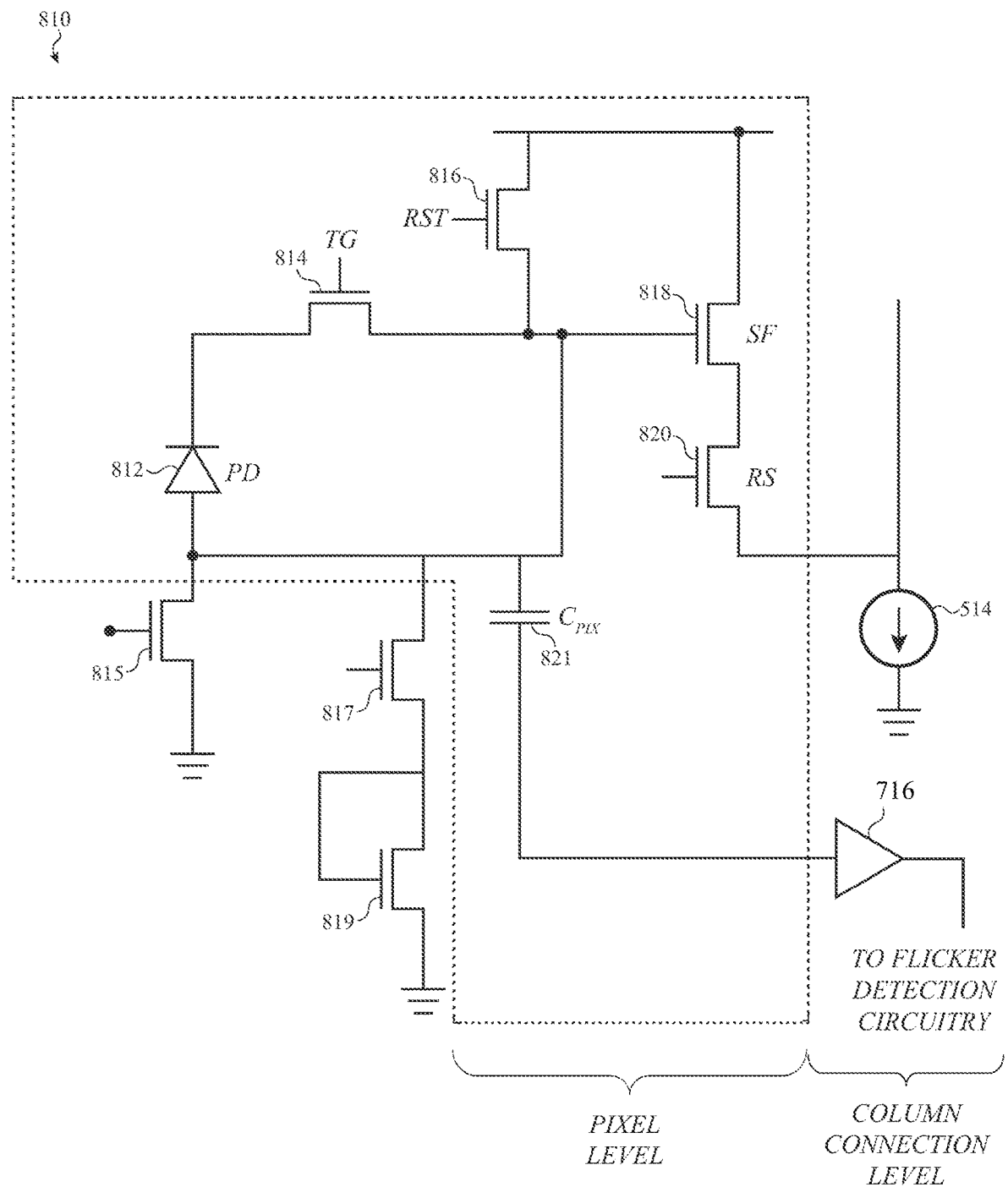
FIG. 8B shows a circuit diagram for certain components of a pixel of a pixel array, according to an embodiment.

FIG. 8B shows an equivalent circuit of elements of a pixel 810 that may be included in a pixel array with embedded FCDC, according to an embodiment. The pixel 810 includes a PD 812 in which charge carriers are generated by received photons. The pixel 810 also includes the TG 814 which controls flow of the charge carriers to a capacitive junction represented by the capacitor $C_{PIX}$ 821. The pixel 810 includes a RST transistor 816, a SF transistor 818, and a RS transistor 820, which may be as described previously. As described above, in an image capture operation, the light-generated charge carriers produce a current on the column output connection, which may be amplified or buffered by the system readout circuitry 514.

However, the pixel 810 is configured so that the anode of its PD 812 does not connect directly to a ground connection of the pixel array as in previously described pixels, but instead connects both through a flicker disable transistor 815 to a ground connection of the pixel array, and to a flicker enable transistor 817. The flicker enable transistor 817 connects to the pixel array ground connections through resistive transistor 819 configured as resistor.

During a flicker current detection operation, a voltage applied to the gate of the flicker disable transistor 815 makes it an open circuit connection, and the corresponding opposite voltage applied to the gate of the flicker enable transistor 817 causes it to function as a closed circuit connection, so that charge carriers of the PD 812 may accumulate in the capacitive region $C_{PIX}$ 821. Flicker current from the pixel 810 is then an input to the transimpedance amplifier 716, as described above.

Figure 9A:
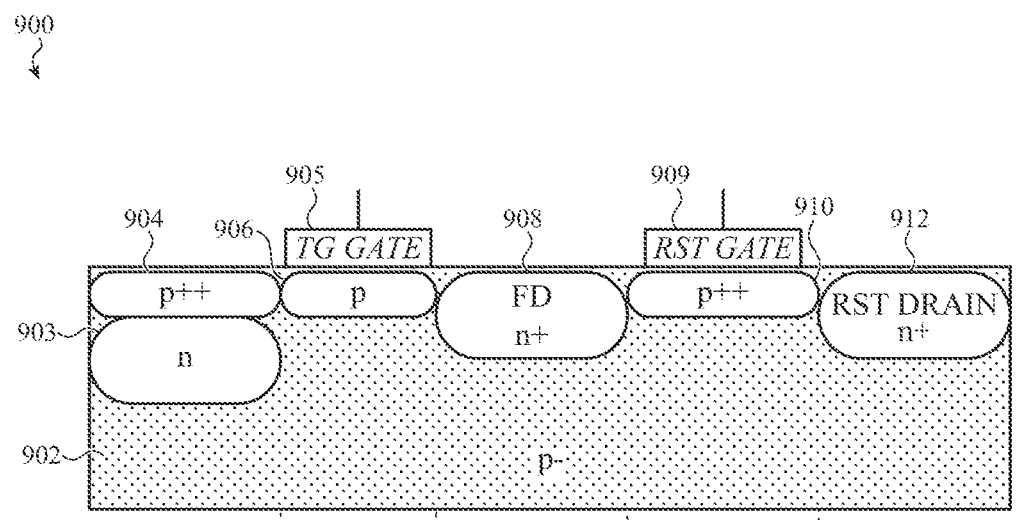
FIG. 9A shows a cross-sectional view of components of a pixel of a pixel array, according to an embodiment.

FIG. 9A shows a cross-section of a pixel 900, such as may be a pixel of a pixel array with embedded FCDC. The pixel 900 is formed in a weakly doped p-type semiconductor substrate 902 and has a PD section that includes the strongly doped p-type cathode region 904 and the n-type anode region 903. The TG transistor 905 includes a p-type channel region 906 formed in the substrate 902. A voltage applied to the gate of the TG transistor 905 allows light-generated charge carriers to flow through the p-type channel region 906 to the n-type FD node region 908. The RST transistor 909 controls flow of charge carriers through the p-type channel region 910 to the RST transistor drain region 912. The configuration shown allows for flow of electrons through the RST transistor 909 and collection of electrons at a $V_{DD}$ node, and for FCDC positioned opposite to the light receiving side of the pixel 900.

Figure 9B:
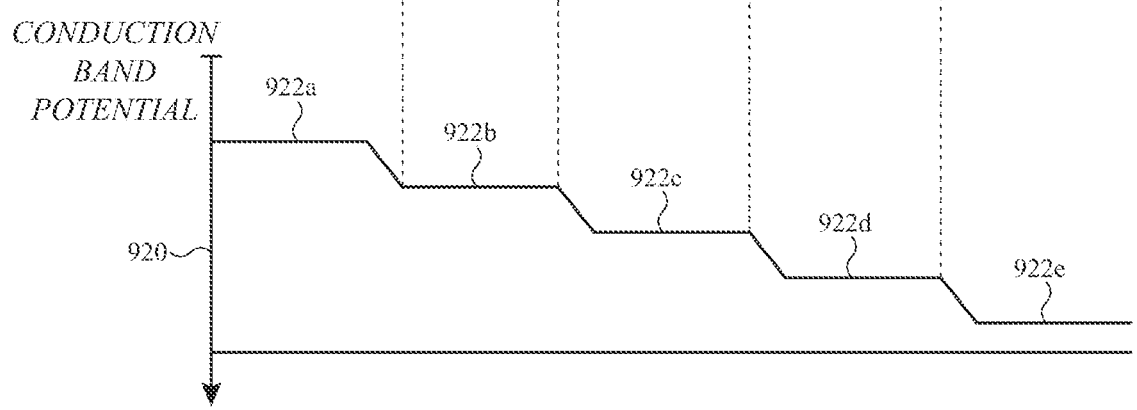
FIG. 9B shows a conduction band profile of the pixel of FIG. 9A, according to an embodiment.

FIG. 9B shows a graph 920 of corresponding voltage levels of the conduction band of the semiconductor regions of the pixel 900 of FIG. 9A. The doping levels of the respective regions of the pixel 900 are adjusted to produce the increasing (from left to right) threshold voltage profile shown, under applied voltages for conduction. The PD region is at voltage level 922a, the TG transistor channel region 906 is at voltage level 922b, the FD node 908 is at voltage level 922c, the p-type channel region of the RST transistor 909 is at voltage level 922d, and the drain region 912 of the RST transistor 909 is at voltage level 922e. The voltage levels 922a-e increase when the pixel is biased for electron current flow to the $V_{DD}$ node.

Figure 10A:
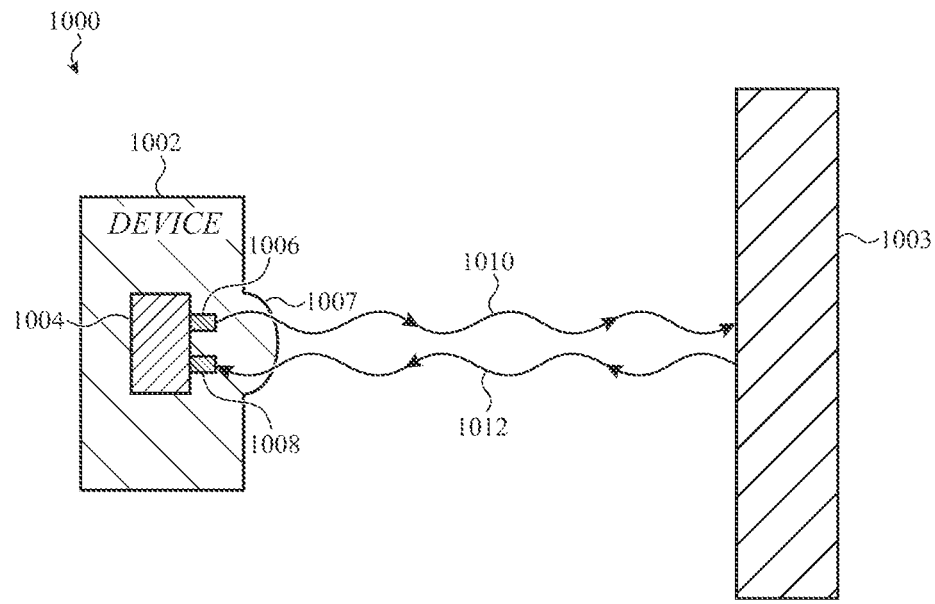
FIG. 10A shows a configuration of an image sensor of an electronic device for proximity sensing, according to an embodiment.

FIG. 10A illustrates the configuration 1000 in which an electronic device 1002 is able to detect the proximity to an exterior object 1003 in its environment. The electronic device 1002 includes the image sensor 1004, which may be a component of a camera. The image sensor 1004 includes a pixel array 1008, such as any of the pixel arrays described above. In some embodiments, the pixel array 1008 in turn may include an embedded light source 1006, which may be formed in a common semiconductor substrate with the pixels of the pixel array 1008. In alternative embodiments, the light source 1006 may be separate from the pixel array. For simplicity of discussion, the pixel array 1008 and the light source 1006 are shown side-by-side in FIG. 10A. The light source 1006 may be a light emitting diode (LED); in particular, it may be a laser light emitting diode. In the configuration 1000, the electronic device 1002 has a lens in an aperture 1007. The image sensor 1004 of the electronic device 1002 is configured so that light from the environment is received through the aperture 1007 and focused onto the pixel array 1008 of the image sensor 1004. Emitted light from the light source 1006 may be emitted either through the aperture 1007, or through a separate aperture (not shown). The image sensor 1004 in the configuration 1000 may be operable both for image capture and proximity detection.

The light source 1006 emits a light 1010, which may, though not necessarily, be in the infrared, visible, or ultraviolet wavelengths, and which may have a predominantly single wavelength, such as from a laser LED. The light source 1006 emits light that is amplitude modulated, with a modulation frequency that may be on the order of 10 MHz.

Reflections 1012 of the emitted light 1010 may be received on the pixel array 1008 of the image sensor 1004. A phase shift between the modulated emitted light 1010 and the reflections 1012 may be used to calculate a time-of-flight value between emissions and received reflections. In turn, the time-of-flight value allows for estimation of the proximity of the electronic device 1002 and the exterior object 1003.

Figure 10B:
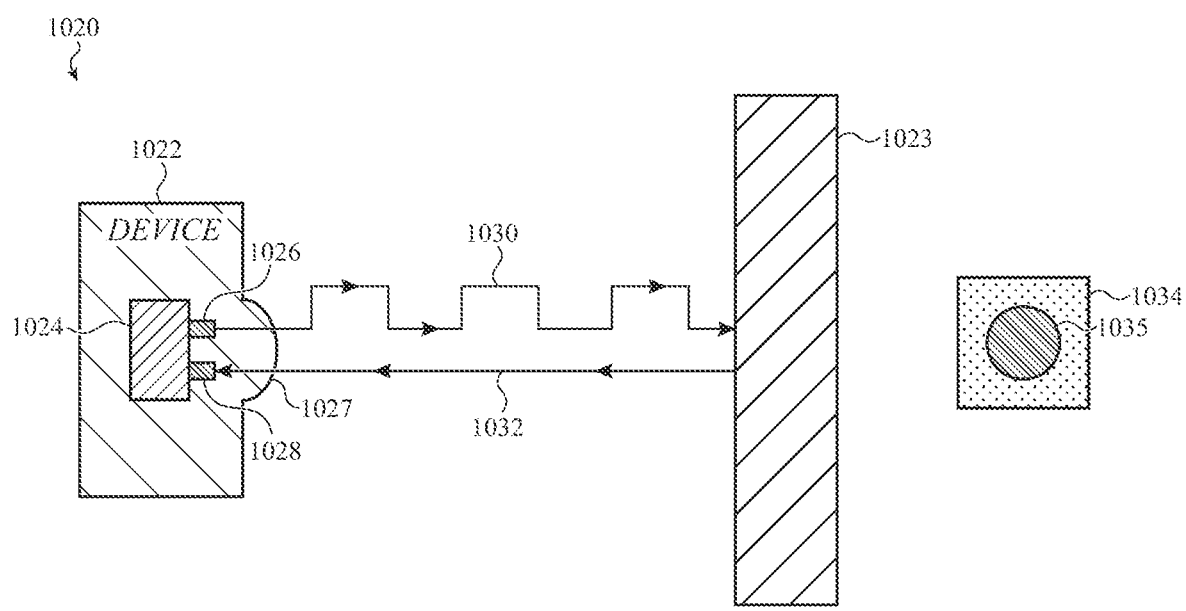
FIG. 10B shows a configuration of an image sensor of an electronic device for proximity sensing, according to an embodiment.

FIG. 10B illustrates an alternative configuration 1020 for proximity detection of an object 1023 by an electronic device 1022 that includes the image sensor 1024. The image sensor 1024 may include a pixel array 1028 that in turn may include an embedded light source 1026. Alternatively, the light source 1026 may be a component separate from the pixel array. In the case of an embedded light source 1026, the embedded light source 1026 may be formed in a common semiconductor substrate with the pixels of the pixel array 1028. For simplicity of discussion, the pixel array 1028 and the light source 1026, whether embedded or separate, are shown side-by-side in FIG. 10B. The light source 1026 may be a light emitting diode (LED); in particular, it may be a laser light emitting diode. In the configuration 1020, the electronic device 1022 has a lens in an aperture 1027. The image sensor 1024 of the electronic device 1022 is configured so that light from the environment is received through the aperture 1027 and focused onto the pixel array 1028 of the image sensor 1024. The emitted light from the light source 1026 may either be emitted through the aperture 1027 or through a separate aperture. The image sensor 1024 in the configuration 1020 may be operable both for image capture and proximity detection.

The light source 1026 emits a light 1030, which may, though not necessarily, be in the infrared, visible, or ultraviolet wavelengths, and which may have a predominantly single wavelength, such as from a laser LED. The light source 1026 emits light that is amplitude modulated by a square wave having successive high and low amplitudes. The modulation frequency may be on the order of 1 kHz.

Reflections 1032 of the emitted light 1030 may vary in intensity due to the amplitude modulation of the emitted light 1030. The reflections 1032 of the emitted light 1030 may be focused onto a region 1035 of a section 1034 of the pixel array 1028. The image sensor 1024 may have current detection circuitry analogous to the FCDC described above, which is separate from the image capture readout circuitry. Such current detection circuitry may be embedded in the pixel array 1028 as part of a common semiconductor substrate.

During a proximity detection operation by the electronic device 1022, output transistors of pixels of the pixel array 1028, such as the SF transistors and RS transistors, are disabled during a proximity detection operation. Then light-generated current can be measured by the current detection circuitry during each of the successive periods of high and low amplitudes in the modulated emitted light 1030.

Variations in the intensity of the reflected light 1032 between periods of high and low amplitude may be used to estimate the proximity of the electronic device 1022 to the object 1023. The intensity of the reflected light 1032 inferred from the measured current during a low amplitude period may provide a baseline value to account for properties of the object 1023, such as color and reflectivity, among other properties. An increased intensity of the reflected light 1032 inferred from the measured current during a high amplitude period may then be correlated with the distance to the object

1023. The average intensity is often proportional as the inverse square of the distance to the object 1023.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An image sensor, comprising:
 a pixel array, each pixel of the pixel array containing a respective photodiode (PD) electrically connected to respective readout circuit elements of a pixel; and
 flicker current detection circuitry (FCDC);
 wherein:
  the pixel array and the FCDC are formed on a common semiconductor substrate;
  a set of pixels of the pixel array is electrically connected to the FCDC; and
  the image sensor is operable to detect a flicker in an ambient light by:
   collecting light-generated charge carriers of the respective PDs of the set of pixels;
   combining, by the FCDC, the light-generated charge carriers of the respective PDs of the set of pixels at the FCDC to form a total light-generated current; and
   analyzing signal patterns related to the total light-generated current to characterize the flicker in the ambient light.

2. The image sensor of claim 1, wherein the FCDC includes a transimpedance amplifier.

3. The image sensor of claim 1, wherein the respective light-generated charge carriers of the respective PDs of the set of pixels are received at the FCDC from at least one of respective in-pixel anode or cathode connections of the set of pixels.

4. The image sensor of claim 3, wherein the respective in-pixel anode or cathode connections of the set of pixels are located opposite to a light-receiving side of the pixel array.

5. The image sensor of claim 3, wherein the respective in-pixel anode or cathode connections of the set of pixels are located on a light-receiving side of the pixel array.

6. The image sensor of claim 3, further comprising deep trench isolation walls separating pixels of the pixel array.

7. The image sensor of claim 6, wherein:
 the respective PDs of the set of pixels have a section of increasing positive doping gradient adjacent at least to one of the deep trench isolation walls, the section of increasing positive doping gradient extending toward a light-receiving side of the pixel array; and
 at least one pixel ground connection is positioned on the light-receiving side adjacent to the section of increasing positive doping gradient and is electrically connected to the FCDC.

8. The image sensor of claim 6, wherein:
 the deep trench isolation walls include conductive material; and
 the respective in-pixel anode or cathode connections of the set of pixels contact the deep trench isolation walls and are located opposite to a light-receiving side of the pixel array.

9. The image sensor of claim 1, wherein the total light-generated current is received through reset transistors of the set of pixels.

10. An electronic device comprising:
 a housing having an aperture; and
 a camera configured to receive light through the aperture; wherein:
  the camera includes a pixel array positioned to receive ambient light through the aperture on a light-receiving side;
  the pixel array includes flicker current detection circuitry (FCDC) formed with pixels of the pixel array on a common semiconductor substrate;
  a set of pixels of the pixel array is electrically connected with FCDC; and
  the electronic device is operable to:
   detect a flicker in the ambient light using a combination of light-generated currents from the set of pixels of the pixel array during a first time interval; and
   record an image with the camera during a subsequent time interval using compensation for the flicker detected in the ambient light.

11. The electronic device of claim 10, wherein the FCDC includes a transimpedance amplifier that is operable to receive the combination of light-generated currents.

12. The electronic device of claim 11, wherein the camera further includes:
 an analog-to-digital converter that is operable to receive an output signal of the transimpedance amplifier and produce a digital output signal based on the output signal of the transimpedance amplifier; and
 a digital signal processor operable to determine frequency components of the flicker in the ambient light based on the digital output signal.

13. The electronic device of claim 12, wherein the analog-to-digital converter is formed on the common semiconductor substrate.

14. The electronic device of claim 11, wherein the FCDC is further operable to:
 detect a fault in a subset of the set of pixels; and
 electrically exclude the combination of light-generated currents of the subset of the set of pixels of the set of pixels from the combination of light-generated currents during the first time interval.

15. The electronic device of claim 14, wherein the fault is a current level exceeding a tolerance level.

16. The electronic device of claim 10, wherein:
 the set of pixels of the pixel array each is connected to a grid of metallic conductors positioned on the light-receiving side of the pixel array; and
 pixels of the set of pixels are electrically separated from other pixels of the pixel array by deep trench isolation walls.

17. An electronic device comprising:
 a housing having an aperture; and
 a camera positioned to receive ambient light through the aperture; wherein, the camera includes a pixel array and a light source;
 the camera is operable to direct the received ambient light onto the pixel array;
 the light source is operable to emit light from the electronic device toward an exterior object; and the electronic device is operable to detect a proximity to the exterior object based on reflections of the emitted light received on the pixel array through the aperture.

18. The electronic device of claim 17, wherein:

the light source is a light-emitting diode;

the emitted light is amplitude modulated by a low frequency square wave having successive high and low amplitude periods; and the proximity to the exterior object is based on differences between electrical signals generated at the pixel array during high amplitude periods and low amplitude periods.

19. The electronic device of claim 17, wherein:

the light source is a light-emitting diode;

the emitted light is amplitude modulated by a high frequency sinusoid wave; and the proximity to the exterior object is based on a phase shift between the high frequency sinusoid wave and a signal generated by the reflections of the emitted light received on the pixel array.

20. The electronic device of claim 19, wherein:

the pixel array includes a set of pixels connected to a metallic grid formed on the pixel array;

the set of pixels of the pixel array is operable to generate respective currents on the metallic grid from the reflections of the emitted light received on the pixel array;

the metallic grid is connected to a transimpedance amplifier formed on the pixel array; and the transimpedance amplifier is operable to receive a combination of the generated respective currents.

* * * * *